US010915284B2

United States Patent
Hollis et al.

(10) Patent No.: US 10,915,284 B2
(45) Date of Patent: Feb. 9, 2021

(54) MULTI-MONITOR FULL SCREEN MODE IN A WINDOWING ENVIRONMENT

(71) Applicant: Lockheed Martin Corporation, Bethesda, MD (US)

(72) Inventors: Howell Hollis, Orlando, FL (US); Michael C. Semeniuk, Orlando, FL (US); Robert Charles McCarthy, Orlando, FL (US); Zachary James Heylmun, Orlando, FL (US); Hong Phuoc Nguyen, Orlando, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 843 days.

(21) Appl. No.: 13/953,886

(22) Filed: Jul. 30, 2013

(65) Prior Publication Data
US 2015/0040062 A1     Feb. 5, 2015

(51) Int. Cl.
*G06F 3/14*       (2006.01)
*G09G 5/399*     (2006.01)
*G09G 5/14*      (2006.01)

(52) U.S. Cl.
CPC .......... *G06F 3/1423* (2013.01); *G06F 3/1446* (2013.01); *G09G 5/14* (2013.01);
(Continued)

(58) Field of Classification Search
CPC ................ G06F 3/1423; G06F 3/1446; G09G 2370/042; G09G 2340/0464; G09G 2356/00; G09G 5/14; G09G 5/399
See application file for complete search history.

(56) References Cited

U.S. PATENT DOCUMENTS 6,018,340 A * 1/2000 Butler ..................... G06F 3/038
                                                      345/156
6,025,871 A    2/2000 Kantor et al.
(Continued)

FOREIGN PATENT DOCUMENTS

WO     2010083168 A1     7/2010

OTHER PUBLICATIONS

Daniel Eran Dilger Inside OS X 10.8 Mountain Lion GM: Go Full Screen on any display Jul. 21, 2012 8 pages.*
(Continued)

*Primary Examiner* — Andrea N Long
(74) *Attorney, Agent, or Firm* — Foley & Lardner LLP

(57) ABSTRACT

Mechanisms for implementing a multi-monitor full screen mode in an application module are disclosed. An application module determines a number (N) of monitors that are coupled to a plurality of video ports of a device. The application module directs a window management module (WMM) that is independent of the application module to display at least one cover window that has dimensions coextensive with dimensions of respective maximum display areas of the N monitors. A primary monitor of the N monitors is determined, and a full screen display area associated with the primary monitor is determined. A main application window of the application module is sized to have dimensions that are at least coextensive with dimensions of the full screen display area, and the WMM is directed to display the main application window on the at least on primary monitor.

20 Claims, 20 Drawing Sheets

(52) U.S. Cl.
CPC ..... *G09G 5/399* (2013.01); *G09G 2340/0464* (2013.01); *G09G 2356/00* (2013.01)

(56) References Cited

U.S. PATENT DOCUMENTS

| | | | |
|---|---|---|---|
| 6,411,302 B1* | 6/2002 | Chiraz | G06F 3/1431 345/531 |
| 6,501,441 B1* | 12/2002 | Ludtke | G06F 3/1446 345/1.1 |
| 6,774,912 B1 | 8/2004 | Ahmed et al. | |
| 7,600,190 B2 | 10/2009 | Wang | |
| 8,763,052 B2* | 6/2014 | Theberge | H04N 7/17318 709/231 |
| 2002/0051017 A1* | 5/2002 | Wishoff | G06F 3/0481 715/774 |
| 2003/0079032 A1* | 4/2003 | Orsolits | H04L 12/2602 709/230 |
| 2003/0223182 A1* | 12/2003 | Yurugi | G06F 1/1616 361/679.55 |
| 2004/0025112 A1* | 2/2004 | Chasen | G06F 9/451 715/202 |
| 2005/0020238 A1* | 1/2005 | Eastman | H04H 20/28 455/403 |
| 2005/0160302 A1* | 7/2005 | Asakura | G06F 1/3203 713/320 |
| 2005/0204284 A1* | 9/2005 | Park | G09G 5/003 715/700 |
| 2005/0265609 A1* | 12/2005 | Morishige | H04N 5/775 382/235 |
| 2006/0171453 A1* | 8/2006 | Rohlfing | G08B 13/19632 375/240.01 |
| 2006/0200517 A1* | 9/2006 | Nelson | H04L 65/4023 709/204 |
| 2006/0206825 A1* | 9/2006 | Dorn | G06F 3/0481 715/761 |
| 2006/0224963 A1 | 10/2006 | Katsuranis et al. | |
| 2006/0288371 A1* | 12/2006 | Jun | H04M 1/72522 725/52 |
| 2007/0016867 A1* | 1/2007 | Nickell | G06F 9/4443 715/730 |
| 2007/0024645 A1* | 2/2007 | Purcell | G06F 3/1431 345/634 |
| 2007/0226644 A1* | 9/2007 | Bradfield | G06F 3/038 715/781 |
| 2007/0233792 A1* | 10/2007 | Sylthe | G06Q 10/107 709/206 |
| 2008/0045234 A1* | 2/2008 | Reed | H04W 8/02 455/456.1 |
| 2008/0153452 A1* | 6/2008 | Huang | H04B 1/3816 455/403 |
| 2008/0177994 A1* | 7/2008 | Mayer | G06F 9/4418 713/2 |
| 2011/0037711 A1 | 2/2011 | Siddiqui et al. | |
| 2011/0043696 A1 | 2/2011 | Onogi et al. | |
| 2011/0144970 A1 | 6/2011 | Jiang et al. | |
| 2012/0050260 A1* | 3/2012 | Cheng | G06F 3/1438 345/419 |
| 2012/0182210 A1 | 7/2012 | Chan et al. | |
| 2013/0002568 A1* | 1/2013 | Selim | G06F 1/1616 345/173 |
| 2013/0022292 A1* | 1/2013 | Miyagi | H04N 1/00145 382/286 |
| 2014/0040819 A1* | 2/2014 | Duffy | G06F 9/4443 715/789 |
| 2014/0304643 A1* | 10/2014 | Holland | G06F 3/0481 715/781 |
| 2014/0351722 A1* | 11/2014 | Frederickson | G06F 9/4443 715/761 |
| 2015/0089395 A1* | 3/2015 | Beel | H04L 12/1822 715/753 |

OTHER PUBLICATIONS

International Search Report and Written Opinion for PCT/US2014/048777, dated Nov. 11, 2014, 9 pages.
Author Unknown, "Class GraphicsDevice (Java Platform SE 6)," Oracle, 2011, http://docs.oracle.com/javase/6/docs/api/java/awt/GraphicsDevice.html, 9 pages.
Author Unknown, "Java Tutorial/Trail: Full-Screen Exclusive Mode API," Wikiversity, http://en.wikiversity.org/wiki/Java_Tutorial/Trail:_Full-Screen_Exclusive_Mode_API, last modified on Aug. 23, 2011, 6 pages.
Kozlov et al., "Why Direct3D application performs better in full screen mode?," Questions and Answers, Stack Exchange Inc., Jun. 22, 2009, http://stackoverflow.com/questions/304669/why-direct3d-application-performs-better-in-full-screen-mode, 3 pages.
Langner et al., "Simulate fullscreen," Questions and Answers, Stack Exchange Inc., Dec. 9, 2009, http://stackoverflow.com/questions/1865453/simulate-fullscreen, 2 pages.
International Preliminary Report on Patentability for International Patent Application No. PCT/US2014/048777, dated Feb. 11, 2016, 6 pages.
Author Unknown, "Direct3D 9Ex Improvements," Retrieved from the Internet Nov. 17, 2016, https://web.archive.org/web/20130605164026/https://msdn.microsoft.com/en-us/library/windows/desktop/ee890072(v=vs.85).aspx, Feb. 27, 2013, Microsoft, 15 pages.
Extended European Search Report for European Patent Application No. 14832276.1, dated Dec. 15, 2016, 12 pages.
Examination Report for European Patent Application No. 14832276.1, dated Dec. 14, 2017, 13 pages.
Examination Report for European Patent Application No. 14832276.1, dated Sep. 7, 2018, 7 pages.
Notice of Acceptance for Australian Patent Application No. 2014296339, dated Dec. 5, 2019, 3 pages.
First Examination Report for New Zealand Patent Application No. 716584, dated Oct. 4, 2019, 2 pages.
Examination Report No. 1 for Australian Patent Application No. 2014296339, dated Mar. 1, 2019, 2 pages.

\* cited by examiner

Prior to Multi-Monitor Full Screen Mode

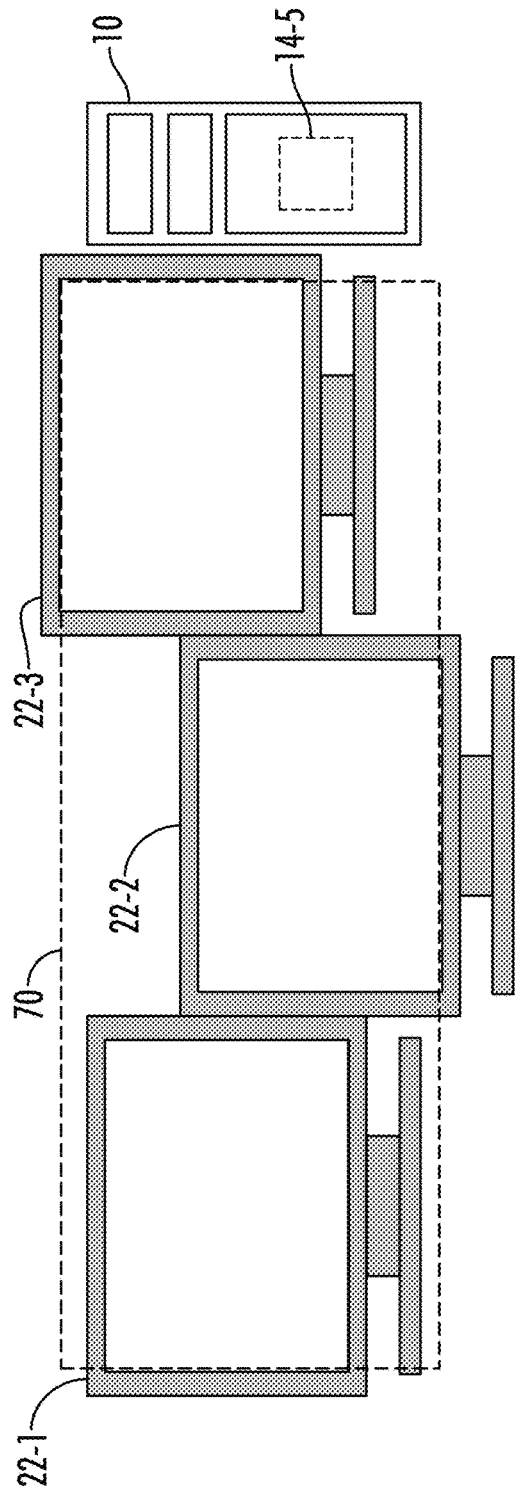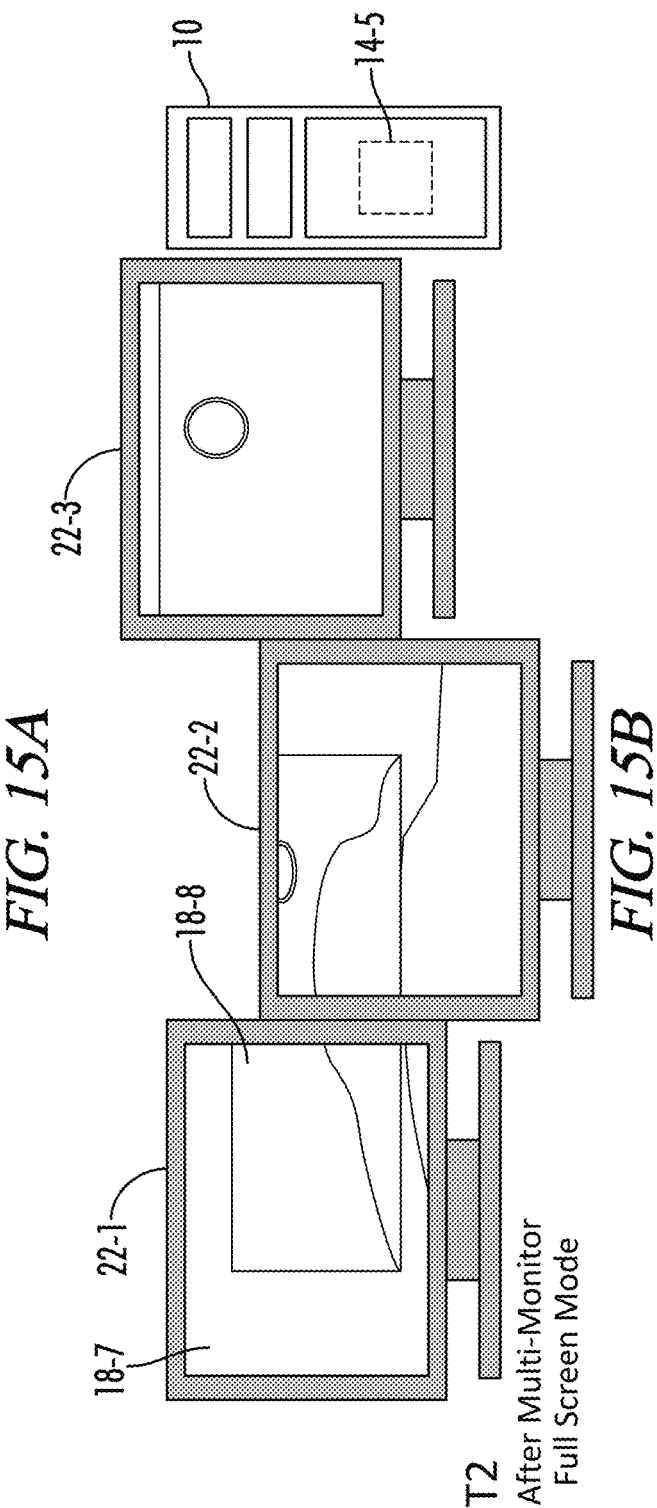

T2
After Multi-Monitor
Full Screen Mode

MULTI-MONITOR FULL SCREEN MODE IN A WINDOWING ENVIRONMENT

TECHNICAL FIELD

The embodiments relate to a multi-tasking windowing environment, and in particular to implementing a multi-monitor full screen mode in a windowing environment of a device.

BACKGROUND

Many computers implement an operating system that allows multiple application programs, referred to herein as application modules, to execute concurrently. Such an operating system is sometimes referred to as a multi-tasking operating system. A number of popular operating systems offer windowing environments wherein a graphical user interface allows a user of the computer to interact with concurrently executing application modules in an intuitive manner. Typically, the user interacts with application modules executing on the computer via one or more user interface windows, the content of which is determined by the application module with which the window is associated.

An executing application module may utilize one, or multiple, windows to interact with the user. The creation, movement and closing of windows is typically managed by the operating system in response to requests from the application module. The operating system maintains information about each window associated with each application module, and determines what should be displayed to the user on a display device at any given time based on the current status of the windows associated with the application modules.

The window or windows displayed to the user at any given point in time may be based in part on activities of the user, such as user input that results in a particular window being the active window. Generally, the operating system may determine, for example, which windows are hidden behind other windows, and thus do not need to be displayed, which windows may overlap other windows, which windows should be displayed in their entirety, whether portions of the desktop should be displayed where no window is located over the desktop, and based on these determinations and perhaps more, the operating system communicates with graphics hardware, sometimes referred to as a graphics card, to direct the graphics card to display the appropriate image on the monitor. This process may occur hundreds of times each second, and collectively implement a real-time multi-tasking windowing environment that can be changed dynamically in response to either input received from the user, or in response to input received from application modules.

For performance purposes and other reasons, most graphic cards and operating systems allow an operating mode wherein the application module, rather than the operating system, is responsible for what is drawn (sometimes referred to as "displayed") on the monitor. This mode is sometimes referred to as "full screen mode." When an application module enters full screen mode, the application module is responsible for providing the information to the graphics card that identifies what will be displayed to the user. Full screen mode is frequently used, for example, by gaming and simulation application modules that require high frame rates and desire complete control over the imagery displayed to the user, including, for example, the ability to completely fill the display area of a monitor with high-resolution imagery.

The use of multiple monitors is increasingly popular with users. Current operating systems essentially expand the operating system desktop to fit the number of monitors in use, and allow users to move windows about the desktop as desired, including crossing monitor borders. The use of full screen mode in conjunction with multiple monitors, however, can be challenging to implement for a developer of an application, and the behavior of certain activities, such as what occurs when an application gains or loses focus, can be poorly defined depending on the operating system at issue. Moreover, switching between windows mode and full screen mode, especially when multiple monitors are in use, can be complex for a developer of an application module, can cause substantial delays for the user as the application module is obtaining control of the monitor or monitors from the operating system, and can be implemented differently from application module to application module, causing an inconsistent experience for the user.

Accordingly, there is a need for a multi-monitor full screen mode that provides the benefits of conventional full screen mode, but eliminates the need for the application module to assume complete responsibility for controlling the display of imagery, and that leverages the operating system to manage the multi-monitor full screen mode and thereby implement predictable windowing behavior.

SUMMARY

The embodiments relate to mechanisms for implementing a multi-monitor full screen mode in an application module on a device. The embodiments provide for the functionality of a conventional full screen mode, but leverage an independent window management module (WMM) to maintain the windows of the application module, to alleviate the complexities otherwise associated with directly maintaining the graphics buffers associated with multiple monitors. The embodiments allow, among other features, plug-in modules to generate child windows which may be displayed during full screen mode along with other windows of the application module.

In one embodiment, a computer-implemented method for implementing a multi-monitor full screen mode in an application module is provided. The method includes determining, by the application module, that the multi-monitor full screen mode is requested. The multi-monitor full screen mode may be determined based on real-time user input, or based on a configuration file, for example. A number (N) of monitors that are coupled to a plurality of video ports of the device are determined. Each monitor has a respective maximum display area. The respective maximum display area encompasses the entire screen of the respective monitor. The application module directs a WMM that is independent of the application module to display at least one cover window that has dimensions coextensive in size with dimensions of the maximum display areas of the N monitors. The cover window may, for example, be a uniform color, such as black, and may overlay the windows associated with all application modules other than the application module. At least one primary monitor of the N monitors is determined, and a full screen display area associated with the primary monitor is determined. A main application window of the application module is sized to have dimensions that are at least coextensive with dimensions of the full screen display area associated with the primary monitor, and the WMM is directed to display the main application window on top of the cover window.

Among other features, the present embodiments provide a multi-monitor full screen mode that appears to a user as a conventional full screen mode, but eliminates the need for the application module to communicate directly with a graphics card, and instead leverages the WMM of the device to manage the windows associated with the application module.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 15A-15B illustrate the non-uniform three monitor configuration illustrated in FIG. 13, and a full screen display area that is not coextensive in size with a maximum display area of a monitor, at a point in time after initiation of the multi-monitor full screen mode, according to another embodiment;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The embodiments relate to mechanisms for implementing a multi-monitor full screen mode in an application module on a device. The embodiments provide for the functionality of a conventional full screen mode, but leverage a window management monitor (WMM) to maintain the windows of the application module, to alleviate the complexities otherwise associated with directly maintaining the graphics buffers associated with multiple monitors. The embodiments allow, among other features, plug-in modules to generate child windows which may be displayed during multi-monitor full screen mode along with other windows of the application module.

Figure 1:
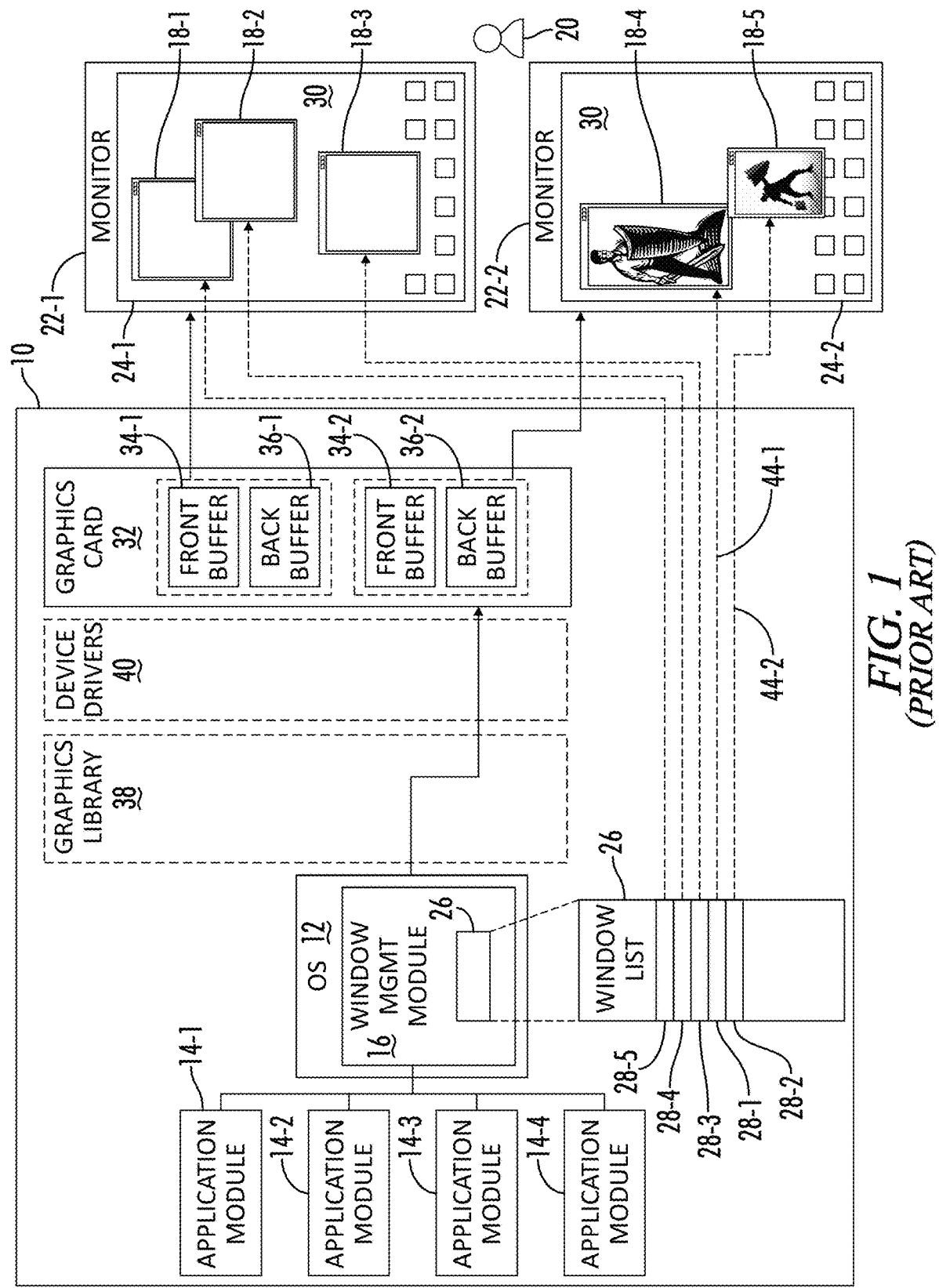
FIG. 1 is a block diagram illustrating conventional windowing mechanisms in a multi-tasking operating system.

Prior to delving into the details of the embodiments, for purposes of context, conventional mechanisms for implementing a full screen mode will be discussed. FIG. 1 is a block diagram illustrating conventional windowing mechanisms in a multi-tasking operating system. A device 10 includes a multi-tasking operating system 12. The operating system 12 initiates and provides services to a plurality of application modules 14-1-14-4 (generally application modules 14). The operating system 12 may comprise any suitable multi-tasking operating system, including, for example, Microsoft® Windows® operating system, the Linux operating system, or the like.

The device 10 also includes a centralized WMM 16 that is configured to manage user interface (UI) windows 18-1-18-5 (generally, windows 18) that are associated with one or more of the application modules 14. The windows 18 are visually depicted to a user 20 on one or more of a plurality of monitors 22-1-22-2 (generally, monitors 22). While only two monitors 22 are illustrated, the embodiments have applicability to any number of monitors 22. While the WMM 16 is illustrated as being part of the operating system 12, the embodiments are not so limited, and can operate in conjunction with a WMM 16 that is independent of the operating system 12. The WMM 16 is independent of the application modules 14, such that the WMM 16 has a different codebase than the application modules 14.

Each monitor 22 has an associated maximum display area 24 that is a function of the size of the screen of the monitor 22. Thus, the monitor 22-1 has a maximum display area 24-1, and the monitor 22-2 has a maximum display area 24-2. A window 18 may be coextensive with a maximum display area 24 of a monitor 22, and thus completely fill the screen of the monitor 22, or, as illustrated, may be of dimensions smaller than the maximum display area 24 of a monitor 22.

In operation, an application module 14 may communicate with the WMM 16 to generate and display a window 18 on a monitor 22. The particular form, or protocol, of communication may differ depending on the particular WMM 16, but generally, the application module 14 directs the WMM 16 to generate a particular window 18, and provides the WMM 16 with various attributes of the window 18, such as size, width and height, location, content, and the like. The WMM 16 maintains a window list 26 that contains structures, such as window entries 28-1-28-5, that correspond to the windows 18-1-18-5. The WMM 16 determines, based on various information, including the attributes of the windows 18 at a given instant in time, what should be displayed to the user 20 on the monitors 22. Specifically, the WMM 16 determines which windows 18 may be entirely hidden behind another window 18, which windows 18 may be partially occluded by another window 18, which windows 18 may be topmost windows and thus visible in their entirety. Additionally, the WMM 16 may take into consideration a desktop 30 that is visually depicted to the user 20, to the extent the desktop 30 is not overlayed by one or more windows 18. The desktop 30 may span multiple monitors 22.

Based on such information, the WMM 16 determines what, at that particular instant in time, should be visually depicted to the user 20. The WMM 16 communicates data based on this determination to a graphics card 32. The graphics card 32 includes memory buffers dedicated to each monitor 22, including a front buffer 34-1 and back buffer 36-1 associated with the monitor 22-1, and a front buffer 34-2 and back buffer 36-2 associated with the monitor 22-2. The WMM 16 identifies to the graphics card 32 what should be rendered in such front buffers 34 and back buffers 36 for display on the monitors 22 to provide the user 20 a seamless experience when using the multiple monitors 22, and for isolating the application modules 14 from both the complexity of communication with the graphics card 32, as well as having to maintain track of the front buffers 34 and back buffers 36 associated with the multiple monitors 22. The process undertaken by the WMM 16 to determine what should be displayed to the user 20 may occur tens or hundreds of times per second.

In order to communicate with the graphics card 32, the WMM 16 interacts with a graphics library 38. The graphics library 38 in turn communicates with device drivers 40. The device drivers 40 are typically developed and manufactured by the manufacturer of the graphics card 32, and issue commands that control the graphics card 32 in response to calls from the graphics library 38. The graphics library 38 may comprise any suitable graphics library that provides an interface between a module, such as the WMM 16, and the device drivers 40 associated with the graphics card 32. Non-limiting examples of suitable graphics libraries 38 include the Microsoft® DirectX® interface library and the OpenGL® interface library. The graphics card 32 may include a graphics processor (not illustrated) which is coupled to the front buffers 34 and back buffers 36. Non-limiting examples of the graphics card 32 include an Accelerated Graphics Port (AGP) or Peripheral Component Interconnect Express (PCI-E) graphics card that includes a GeForce® or Radeon® chipset. For purposes of illustration, the embodiments are discussed in the context of a single graphics card 32, but are not limited to a device 10 having a single graphics card 32, and have applicability to devices 10 having multiple graphics cards 32.

Assume for purposes of illustration the following scenario. The application module 14-1 directs the WMM 16 to generate the window 18-4, and provides the WMM 16 information about the window 18-4, including, for example, information about the size, location, and content of the window 18-4. In response, the WMM 16 generates a window entry 28-1. The window entry 28-1 comprises the information used by the WMM 16 to know how to display the window 18-4 for the user 20, as visually illustrated by a dashed arrow 44-1. The application module 14-1 also directs the WMM 16 to generate the window 18-5, and provides the WMM 16 information about the window 18-5, including, for example, information about the size, location, and content of the window 18-5. In response, the WMM 16 generates a window entry 28-2. The window entry 28-2 comprises the information used by the WMM 16 to know how to display the window 18-5 for the user 20, as visually illustrated by a dashed arrow 44-2. Other window entries 28-3-28-5 comprise the information used by the WMM 16 for displaying windows 18-3, 18-2, and 18-1 respectively. Windows 18-1-18-3 may be associated with, for example, the application modules 14-2-14-4, respectively. The application module 14-1 need not be aware of the state of the desktop 30, which portions of the desktop 30 the windows 18-4, 18-5 overlap, or the windows 18-1-18-3, because the WMM 16 manages the overall display provided to the user 20 on the monitors 22. Nor does the application module 14-1 need to know how to communicate with the graphics card 32, or to maintain the multiple front buffers 34 and back buffers 36 of the graphics card 32, or even that there are two monitors 22.

Figure 2:
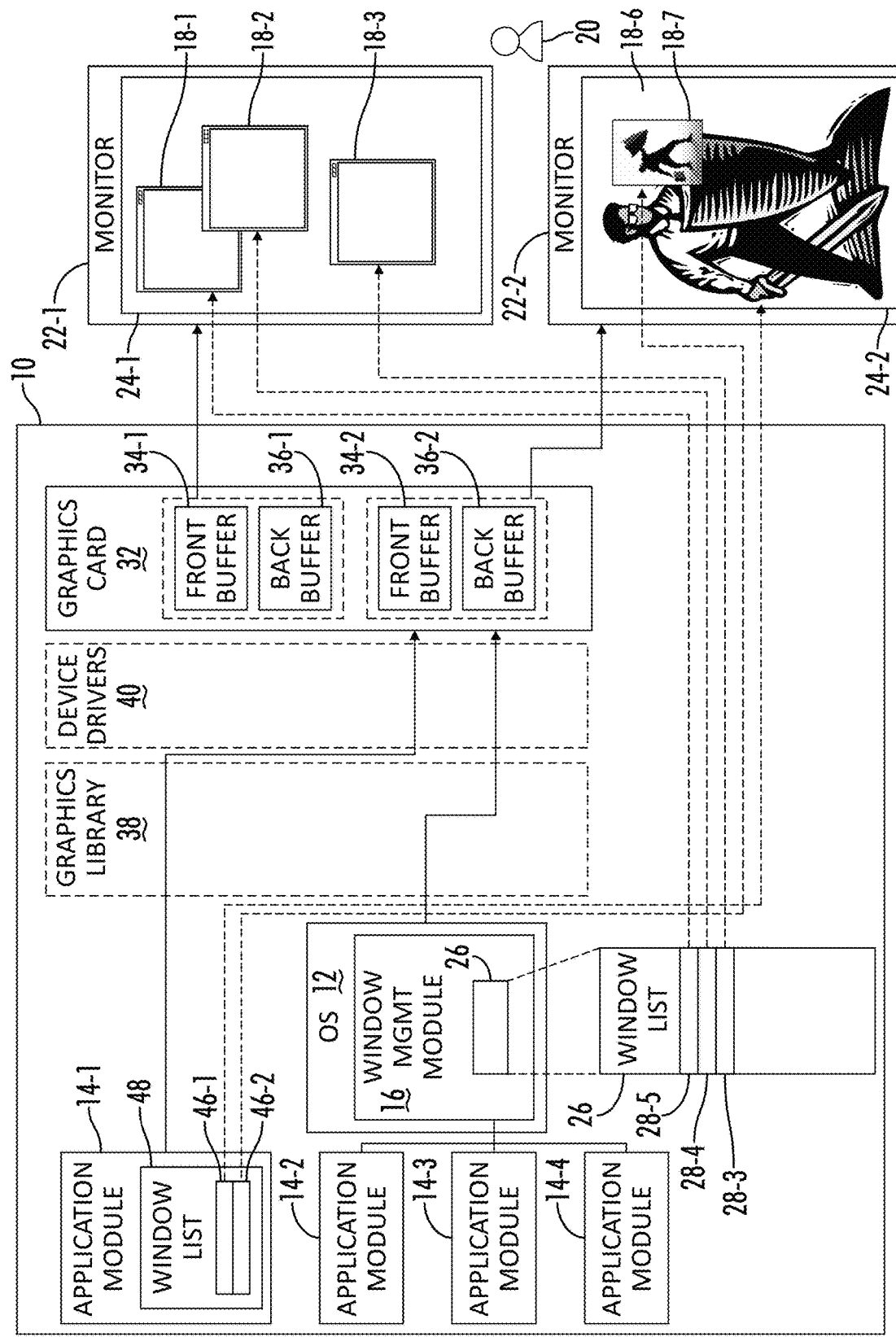
FIG. 2 is a block diagram illustrating conventional full screen mode in a multi-tasking operating system.

FIG. 2 is a block diagram illustrating a conventional full screen mode in the multi-tasking operating system 12. The application module 14-1 receives an indication from the user 20 that the user 20 desires a full screen mode. In response, the application module 14-1 communicates with the WMM 16 to take control of the front buffer 34-2 and back buffer 36-2, so that the WMM 16 does not subsequently alter the front buffer 34-2 and back buffer 36-2 while the application module 14-1 is in full screen mode. The application module 14-1 then generates a window 18-6 which is coextensive with the maximum display area of the monitor 22-2. The window 18-6 is unknown to the WMM 16, and not identified in the window list 26. Accordingly, the application module 14-1 assumes responsibility for communicating with the graphics card 32 via the graphics library 38 and maintaining the content of the front buffer 34-2 and back buffer 36-2, and thereby control what is displayed on the monitor 22-2. The application module 14-1 may maintain the information that defines the window 18-6 in a window entry 46-1 of a window list 48 maintained by the application module 14-1 rather than the WMM 16.

The application module 14-1 may receive a user-initiated request from the user 20 to generate a child window 18-7 that overlays the window 18-6. In response, the application module 14-1 generates a window entry 46-2 that maintains information that defines the window 18-7, including, for example, the size, location and content of the window 18-7. Because the application module 14-1 controls the front buffer 34-2 and back buffer 36-2, the application module 14-1 is responsible for determining what portions of the window 18-6 are overlayed by the window 18-7, so that the windows 18-7 and 18-6 are properly displayed.

Additional problems with the use of conventional full screen mode in conjunction with multiple monitors include the complexity and difficulty of dealing with edge cases, including, for example, windows that span more than one monitor, overlapping windows, and windows that do not completely fill a monitor. Moreover, if the application module 14-1 enables the use of plug-in modules, such as dynamic link libraries, such plug-in modules are unable to generate and provide windows for display on the monitor 22-2, because the application module 14-1 controls the front buffer 34-2 and the back buffer 36-2 and the plug-in module is precluded from accessing the front buffer 34-2 and the back buffer 36-2.

Figure 3A:
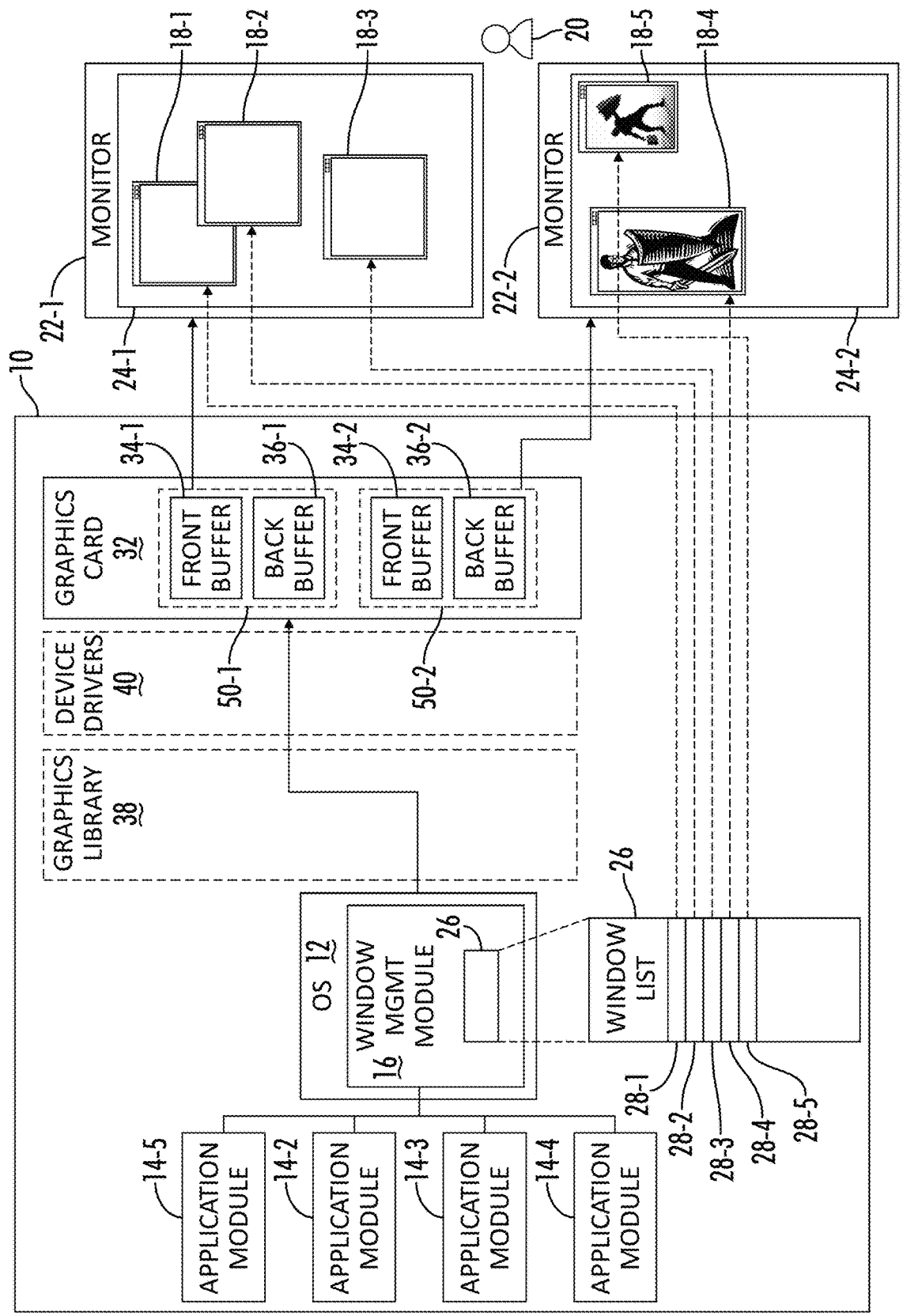
FIGS. 3A-3C are block diagrams illustrating the implementation of a multi-monitor full screen mode according to one embodiment at different points in time.
Figure 3B:
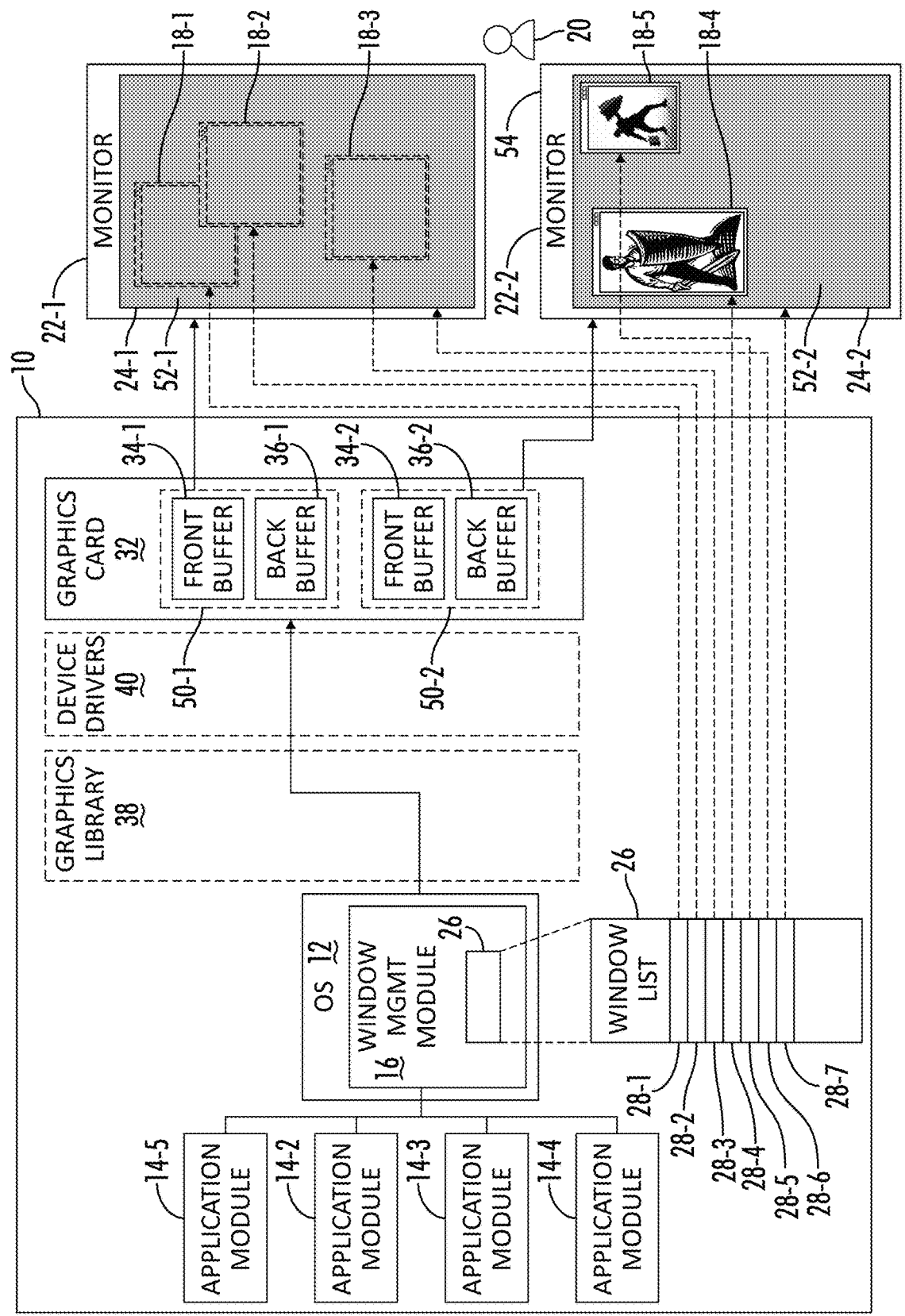
Figure 3C:
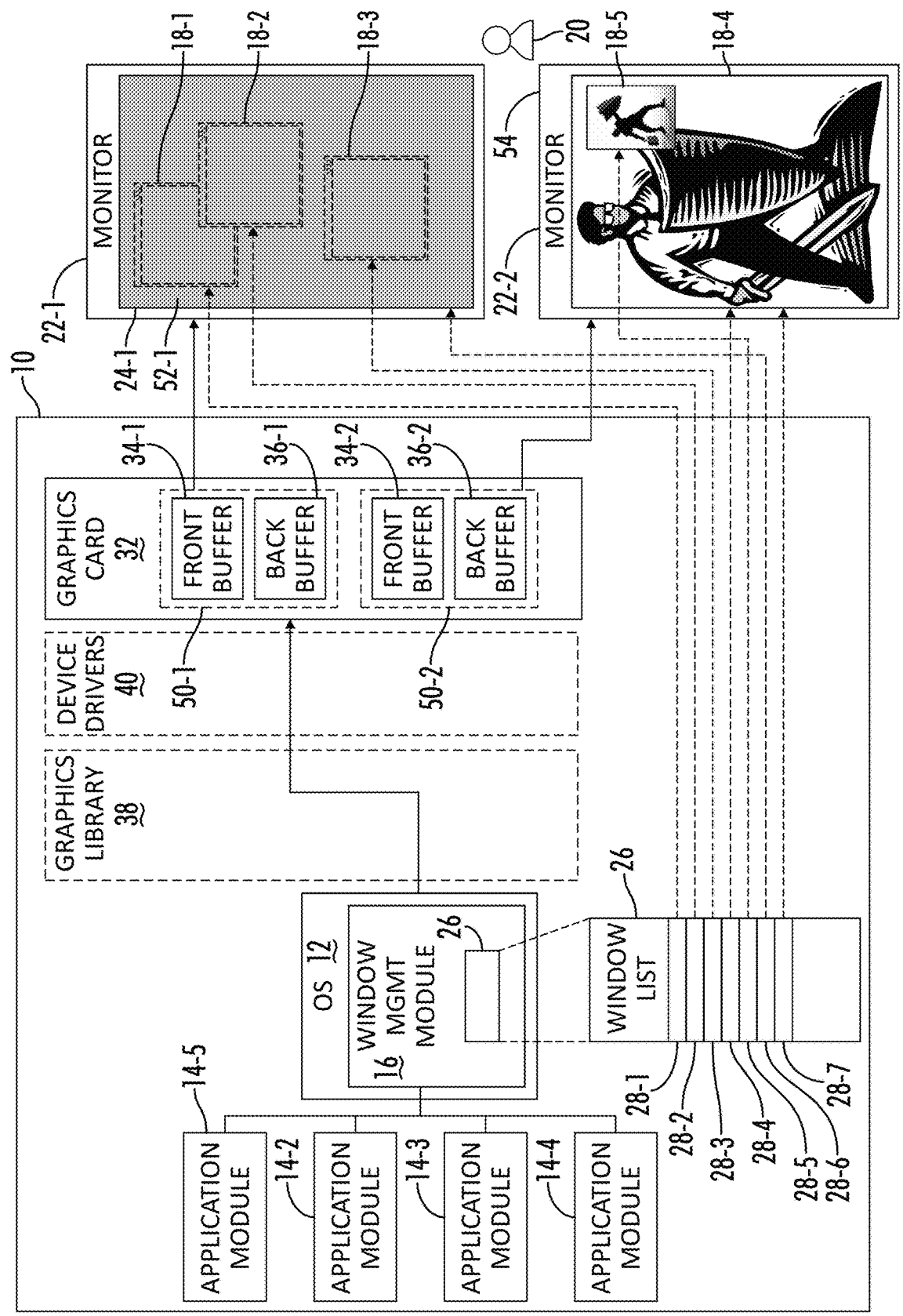
Figure 4:
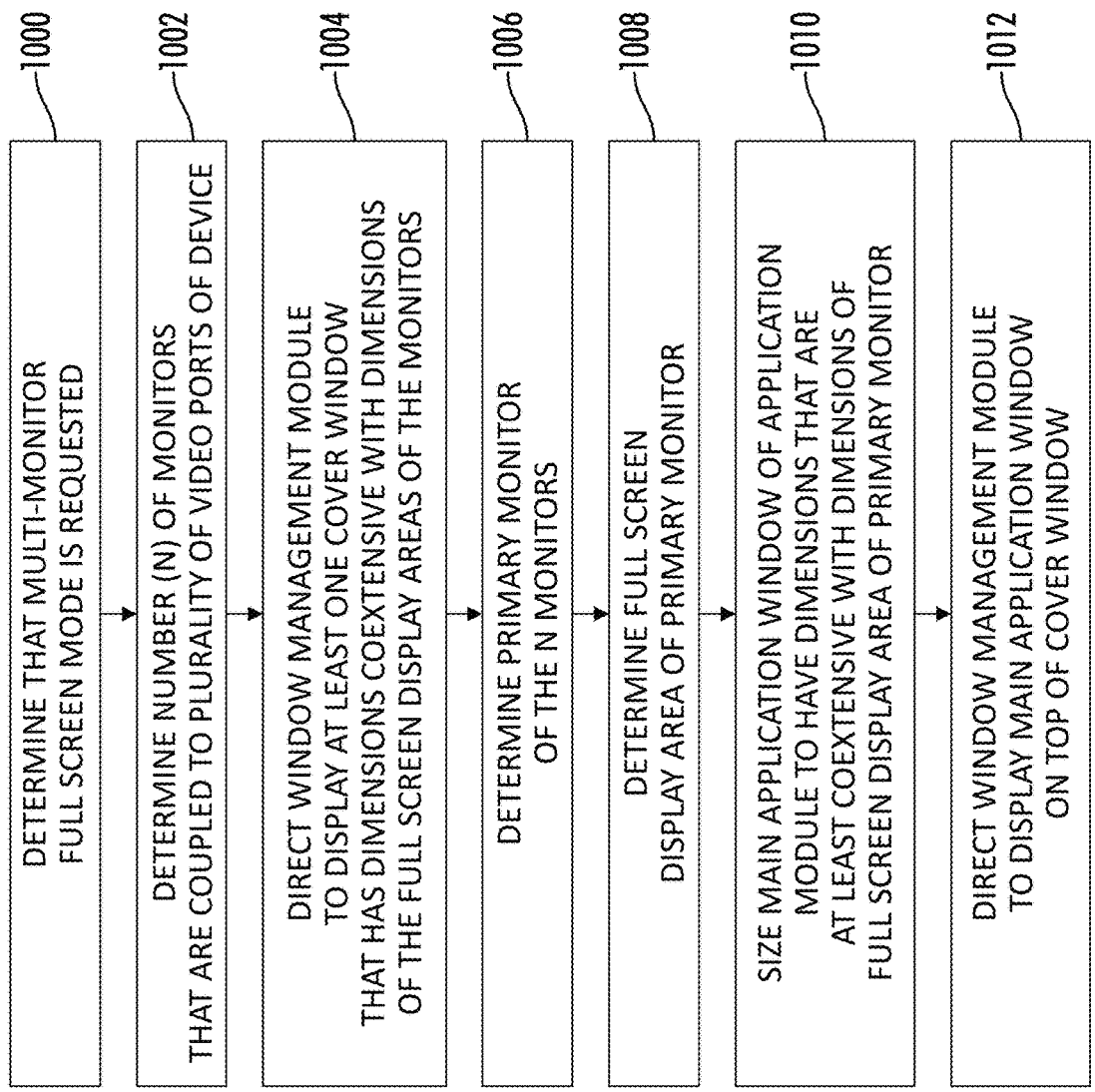
FIG. 4 is a flowchart of a method for implementing a multi-monitor full screen mode according to one embodiment.

FIGS. 3A-3C are block diagrams illustrating a multi-monitor full screen mode according to one embodiment at different points in time. FIG. 4 is a flowchart of a method for implementing a multi-monitor full screen mode according to one embodiment, and will be discussed in conjunction with FIGS. 3A-3C. FIG. 3A illustrates a point in time immediately prior to entering the multi-monitor full screen mode, according to one embodiment. Assume for purposes of illustration that an application module 14-5 has a main application window 18-4 which is displayed on the monitor 22-2, and which is referred to by a window entry 28-4 in the window list 26 of the WMM 16, and the application module 14-5 has a child window 18-5 which is referred to by a window entry 28-5 in the window list 26. Windows 18-1-18-3 are displayed on the monitor 22-1 and are associated with application modules 14-2-14-4, respectively.

The application module 14-5 determines that a multi-monitor full screen mode is requested (FIG. 4, block 1000). The application module 14-5 may make this determination in response to receiving input from the user 20, or, for example, based on a configuration file that indicates a default execution mode of the application module 14-5 is the multi-monitor full screen mode.

The application module 14-5 determines a number N of monitors 22 that are coupled to a plurality of video ports 50-1, 50-2 of the device 10, in this example the number N being equal to two (FIG. 4, block 1002). While for purposes of illustration the device 10 is shown as having a single graphics card 32, the embodiments are not limited to any particular number of graphics cards 32. Moreover, while the graphics card 32 is illustrated as having two video ports 50, the embodiments are not so limited, and have applicability with graphics cards 32 that have fewer than two video ports 50 or more than two video ports 50. Each monitor 22 has a corresponding, or respective, maximum display area 24 that is a function of the size of the screen of the monitor 22.

FIG. 3B illustrates the multi-monitor full screen mode at a subsequent point in time according to one embodiment. The application module 14-5 directs the WMM 16 to display at least one cover window 52 that has dimensions that are at least coextensive with dimensions of the maximum display areas 24 of the monitors 22-1-22-2. In one embodiment, the application module 14-5 directs the WMM 16 to generate a single cover window 52 that is sized to be coextensive with both the maximum display areas 24-1 and 24-2 (FIG. 4, block 1004). In another embodiment, the application module 14-5 directs the WMM 16 to generate a plurality of individual cover windows 52-1, 52-2 (generally, cover window 52), each of which corresponds to one of the monitors 22, and which is coextensive with the maximum display area 24 of the corresponding monitor 22. Each cover window 52 may comprise a solid color, such as black, be non-resizable, have no title bar, and not accept input.

In response to the direction from the application module 14-5, the WMM 16 generates a window entry 28-6 that contains information identifying the cover window 52-1, and a window entry 28-7 that contains information identifying the cover window 52-2. The WMM 16 displays the cover windows 52-1, 52-2. The WMM 16 is directed to display the cover windows 52 on top of other windows 18 that are associated with application modules 14 other than the application module 14-5, such as the windows 18-1-18-3, so that such windows 18-1-18-3 are no longer seen by the user 20, as illustrated in dashed outline in FIG. 3B. In one embodiment a layer order attribute of the cover windows 52 may be set to ensure such cover windows 52 are displayed on top of other windows 18.

The application module 14-5 determines at least one primary monitor 54 of the plurality of monitors 22 (FIG. 4, block 1006). In one embodiment, the primary monitor 54 is determined based on a location of the main application window 18-4 at the time the application module 14-5 determines that the multi-monitor full screen mode is requested. For example, the application module 14-5 determines that the main application window 18-4 is displayed on the monitor 22-2 at the time it is determined that the multi-monitor full screen mode is requested. Based on this determination, the application module 14-5 determines that the monitor 22-2 is the primary monitor 54. In other embodiments, the application module 14-5 may determine that the main application window 18-4 is displayed on multiple monitors 22, such as both the monitors 22-1 and 22-2 at the time it is determined that the multi-monitor full screen mode is requested. In such embodiments, the application module 14-5 may designate the monitor 22-1 or 22-2 on which the majority of the area of the main application window 18-4 is displayed as the primary monitor 54. Alternatively, as discussed in greater detail herein, the application module 14-5 may designate both monitors 22-1 and 22-2 as primary monitors 54.

The application module 14-5 determines a full screen display area of the primary monitor 54 (FIG. 4, block 1008). The full screen display area of the primary monitor 54 may be based on the maximum display area 24-2 of the primary monitor 54, or may be based on a configuration parameter that identifies the full screen display area as an area that is smaller or larger than the maximum display area 24-2, as will be discussed in greater detail below with reference to monitors 22 that are physically arranged in a non-uniform manner.

The application module 14-5 sizes the main application window 18-4 to have dimensions that are at least coextensive with dimensions of the full screen display area of the primary monitor 54 (FIG. 4, block 1010). For purposes of illustration, assume that the full screen display area of the primary monitor 54 is equal to the maximum display area 24-2. In this example, the application module 14-5 sizes the main application window 18-4 to have dimensions that are substantially identical to the dimensions of the maximum display area 24-2, and thus the main application window 18-4 will be a size that takes up the entire screen of the primary monitor 54. The application module 14-5 may also alter attributes of the main application window 18-4, such that the main application window 18-4 contains no title bar, border, menu bar, or the like. The application module 14-5 then directs the WMM 16 to display the main application window 18-4 on top of the cover window 52-2 (FIG. 4, block 1012). In one embodiment, a layer order attribute of the main application window 18-4 may be set to have a higher priority than the cover window 52-2 so that the main application window 18-4 is displayed on top of the cover window 52-2.

FIG. 3C illustrates the multi-monitor full screen mode at a subsequent point in time, after the application module 14-5 has directed the WMM 16 to display the main application window 18-4 on top of the cover window 52-2. Because the main application window 18-4 has dimensions coextensive in size with the cover window 52-2, the main application window 18-4 completely covers the cover window 52-2. In this example, because the application module 14-5 also has an associated child window 18-5, the application module 14-5 sets attributes of the child window 18-5 to be similar to those of the main application window 18-4, and have no title bar or border (i.e., to be borderless), no menu bar, or the like.

The application module 14-5 then directs the WMM 16 to display the child window 18-5 on top of the main application window 18-4. In one embodiment, a layer order attribute of the child window 18-5 may be set to have a higher priority than the main application window 18-4 so that the child window 18-5 is displayed on top of the main application window 18-4.

Because the main application window 18-4 has no border or title bar, the main application window 18-4 may not be resizable or moveable by the user 20 in the same manner windows 18 are typically resizable and moveable when not in the multi-monitor full screen mode. Accordingly, in order to resize the main application window 18-4, the user 20 may indicate to the application module 14-5 a desire to exit the multi-monitor full screen mode. Such desire may be communicated via any desirable mechanism implemented by the application module 14-5. For example, in one embodiment, in response to receiving a right click from an input device that is hovering over the main application window 18-4, the application module 14-5 may present a dialog box with various options, including an option to exit multi-monitor full screen mode.

In one embodiment, prior to altering the attributes of any window 18 currently associated with the application module 14-5, such as the main application window 18-4 and the child window 18-5, the application module 14-5 obtains the attribute values of attributes of each window 18 currently associated with the application module 14-5, and stores the attribute values in a memory, for subsequent use if the multi-monitor full screen mode is exited by the user 20. The attribute values include information that identifies visual characteristics of the main application window 18-4, and user options for altering a size of the main application window 18-4, a location of the main application window 18-4, a size of the main application window 18-4, the status of a border, maximize and minimize buttons, and the like.

In the event the user 20 decides to exit the multi-monitor full screen mode, the application module 14-5 may access the stored attribute values of the main application window 18-4 and the child window 18-5, direct the WMM 16 to apply such stored attribute values to the main application window 18-4 and the child window 18-5, and to display the main application window 18-4 and the child window 18-5 such that the main application window 18-4 and the child window 18-5 are displayed to the user 20 identically as they were displayed prior to entering the multi-monitor full screen mode. Thus, the main application window 18-4 and the child window 18-5 may be displayed at the same size and location, and have the same border, title bar, and other attributes that such windows 18 had immediately prior to entering the multi-monitor full screen mode. Upon receiving the request to exit multi-monitor full screen mode, the application module 14-5 may also direct the WMM 16 to no longer display the cover windows 52-1, 52-2, and thereby cause the windows 18-1-18-3 to be displayed again to the user 20.

In another embodiment, only the main application window 18-4 is completely restored to its previous state prior to entering multi-monitor full screen mode. In contrast, the child window 18-5 may remain at the same size and location as the child window 18-5 was while in multi-monitor full screen mode, but have its window styles, such as a title bar, menu bar, and border, restored.

In one embodiment, as discussed above, when entering the multi-monitor full screen mode the application module 14-5 may set the attributes of the child window 18-5 to have no border, no menu bar, and no title bar, such that the child window 18-5 merely displays content, such as imagery. The application module 14-5 may also have a locked mode, in which the child window 18-5 may not be resized or moved, and may have an unlocked mode, in which the child window 18-5 may be resized or moved. When in unlocked mode, the application module 14-5 may designate a border region of the child window 18-5 as a region by which the user 20 may resize the child application window 18-5, if desired. In one embodiment, this border region may not be visually depicted to the user 20 so as to maintain uninterrupted imagery across the entire child application window 18-5. The application module 14-5 may receive input data indicating that the user 20 has left clicked on the border region of the child window 18-5. The border region may comprise, for example, a 5-10 pixel wide region of the perimeter of the child window 18-5. Upon receipt of the input data, the application module 14-5 may determine that the input device was clicked at a location within the border region, and in response alters the cursor icon from a pointer icon to a resize icon. If the user 20 holds down the left mouse button and drags it to a new location, the application module 14-5 may interpret this action as a resize request, and pass this information to the WMM 16 so that the WMM 16 can resize the child window 18-5 as requested. Note that in conventional full screen mode, the application module 14-5 would control the front buffer 34-2 and back buffer 36-2, and would need to implement such resize request without the aid of the WMM 16.

If, while in unlocked mode, the application module 14-5 receives input data indicating the user 20 has pressed the left mouse button while the cursor of the mouse is over the child window 18-5, but in an area other than the border region, and in an area not over an active control being displayed in the child window 18-5, the application module 14-5 may interpret this input data as a move window request. The application module 14-5 may alter the cursor icon from a pointer icon to a move icon. If the user 20 holds down the left mouse button and drags the mouse cursor to a new location, the application module 14-5 interprets this action as a move request, and passes this information to the WMM 16 so that the WMM 16 can move the child window 18-5 as requested. Note that again, in conventional full screen mode, the application module 14-5 would control the front buffer 34-2 and back buffer 36-2, and would need to implement such move request without the aid of the WMM 16.

Figure 5:
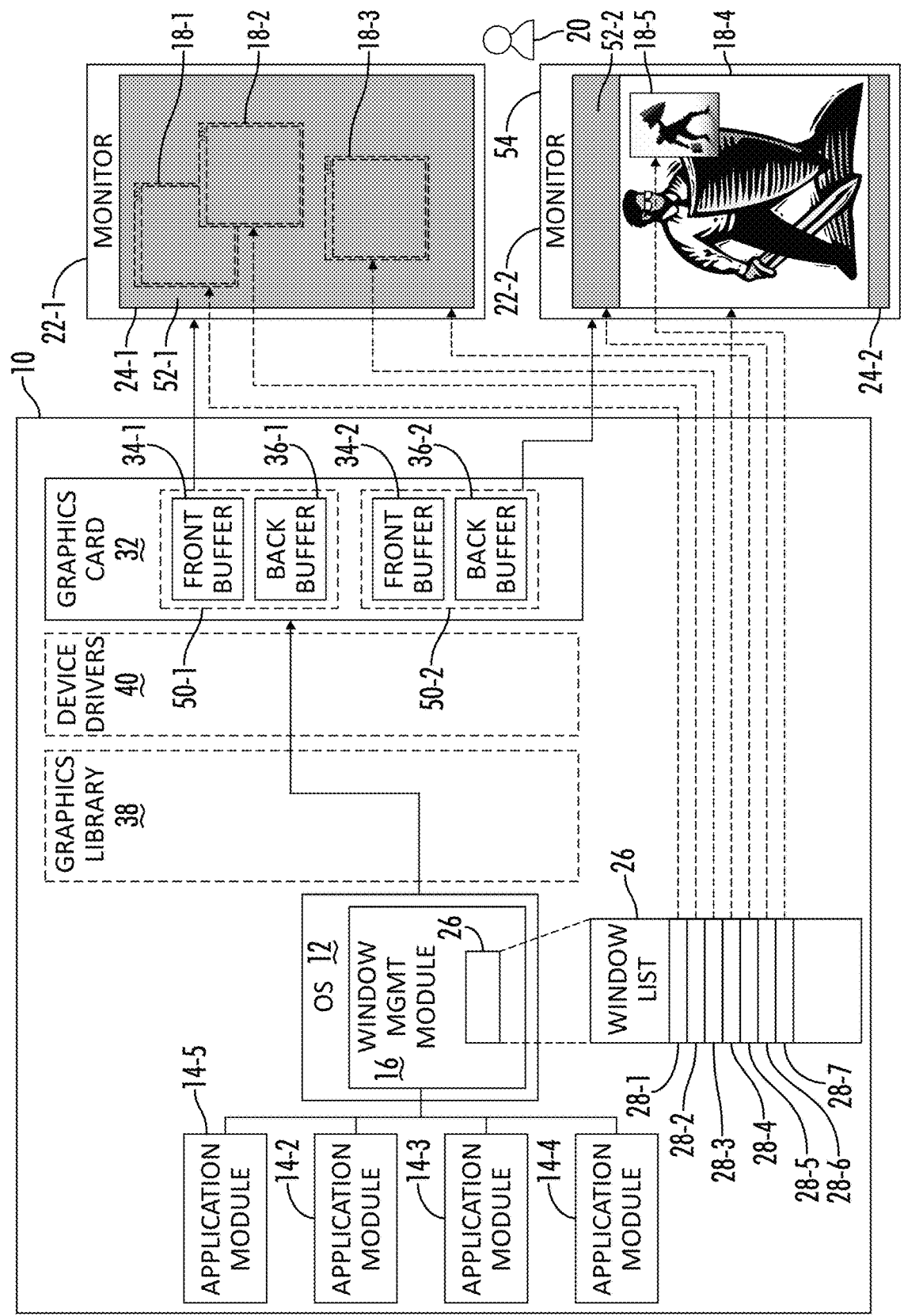
FIG. 5 illustrates a multi-monitor full screen mode wherein the full screen display area differs from the maximum display area of a monitor, according to one embodiment.

FIG. 5 illustrates a multi-monitor full screen mode wherein the full screen display area differs from the maximum display area 24 of a monitor 22, according to one embodiment. In this embodiment, the application module 14-5 determines that the full screen display area has dimensions smaller than the dimensions of the maximum display area 24-2 of the monitor 22-2. As discussed previously, the full screen display area may be designated, for example, in a configuration file (not illustrated) stored on the device 10. FIG. 5 illustrates this embodiment after multi-monitor full screen mode has been entered. Portions of the cover window 52-2 are depicted because the dimensions of the fullscreen display area are not coextensive with the dimensions of the maximum display area 24-2. Note that the main application window 18-4 and the child window 18-5 may otherwise appear identical as illustrated in FIG. 3C, and be borderless, and have no title or menu bars.

Figure 6:
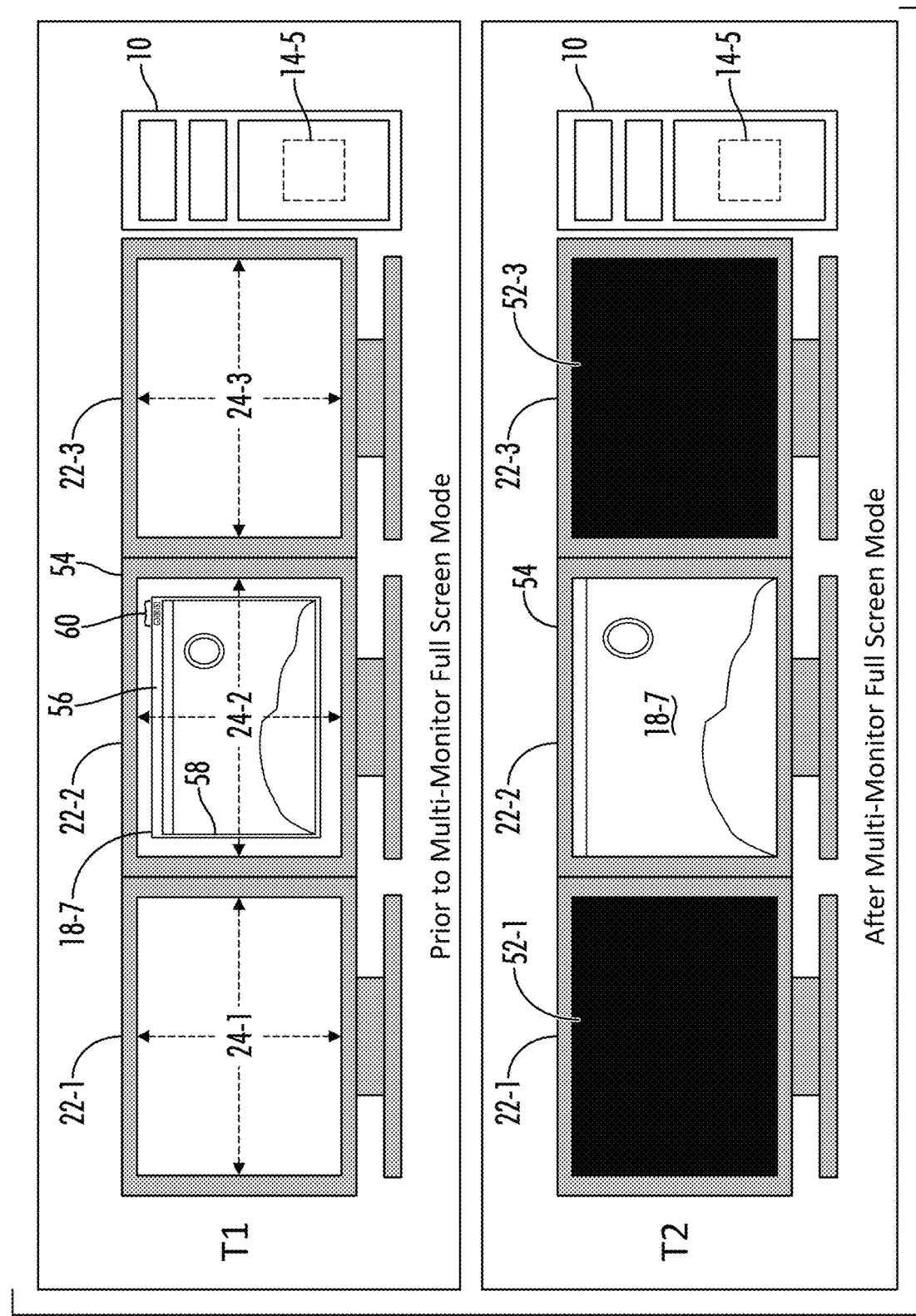
FIGS. 6-12 each visually depict a before-and-after illustration of the multi-monitor full screen mode according to various embodiments.

FIG. 6 visually depicts a before-and-after illustration of the multi-monitor full screen mode according to one embodiment. FIG. 6 will be discussed in conjunction with FIG. 3A. At a time T1, the monitor 22-1 contains no windows 18, and the monitor 22-2 contains a window 18-7 containing a title bar 56 and border 58, as well as various window sizing buttons 60, which may include, for example, a minimize button, a maximize button, and a close window button. The monitor 22-3 contains no windows 18. Assume for purposes of illustration that the window 18-7 is a main application window of the application module 14-5. Upon determining that the multi-monitor full screen mode has been requested, the application module 14-5 determines that the window 18-7 is displayed completely on the monitor 22-2, and thus designates the monitor 22-2 as the primary monitor 54. The application module 14-5 also determines that there are no child application windows of the application module 14-5.

The application module 14-5 directs the WMM 16 (FIG. 3A) to display at least one cover window 52 that is coextensive with the dimensions of the maximum display areas 24-1-24-3 of the monitors 22-1-22-3. The application module 14-5 may direct the WMM 16 to generate a single cover window 52 that is coextensive in size with the cumulative size of the maximum display areas 24-1-24-3, or may direct the WMM 16 to generate three cover windows 52-1-52-3, each of which is coextensive in size with one of the maximum display areas 24-1-24-3.

The application module 14-5 also determines the full screen display area of the monitor 22-2. For purposes of illustration, assume that the full screen display area of the monitor 22-2 is coextensive in size with the maximum display area 24-2. The application module 14-5 sizes the window 18-7 to have dimensions that are coextensive with the full screen display area of the monitor 22-2. The application module 14-5 also alters the styles and other attributes associated with the window 18-7 such that the window 18-7 is borderless, has no title bar 56, and no window sizing buttons 60. The application module 14-5 then directs the WMM 16 to display the window 18-7 on the monitor 22-2. After implementation of the multi-monitor full screen mode according to this embodiment, the monitors 22-1-22-3 may appear as illustrated at time T2.

Figure 7:
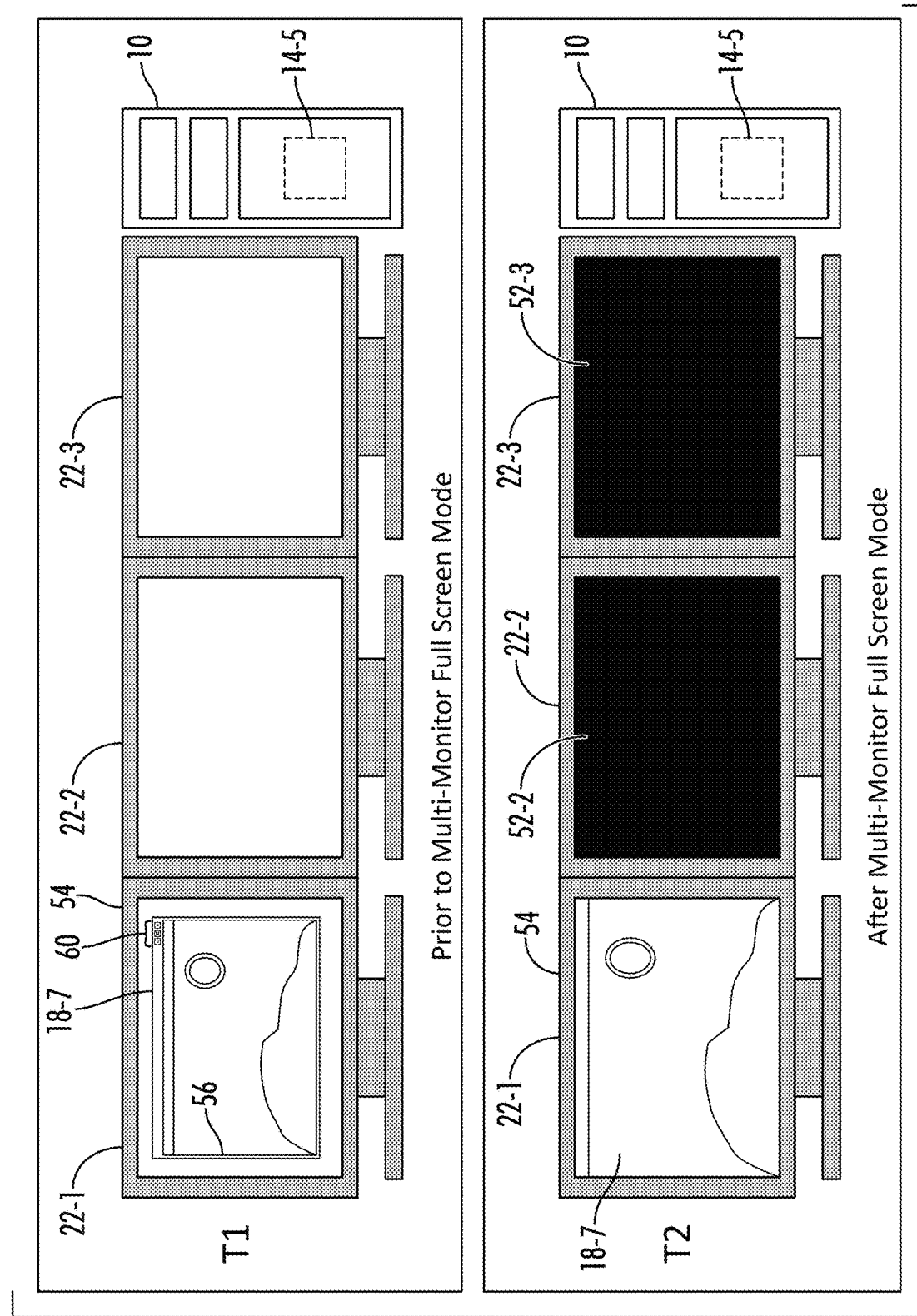

FIG. 7 visually depicts a before-and-after illustration of the multi-monitor full screen mode according to another embodiment. FIG. 7 will be discussed in conjunction with FIG. 3A. In this embodiment, the application window is displayed on the monitor 22-1 rather than the monitor 22-2. Upon determining that the multi-monitor full screen mode has been requested, the application module 14-5 determines that the window 18-7 is displayed completely on the monitor 22-1, and thus designates the monitor 22-1 as the primary monitor 54 rather than the monitor 22-2. After implementation of the multi-monitor full screen mode according to this embodiment, the monitors 22-1-22-3 may appear as illustrated at time T2.

Figure 8:
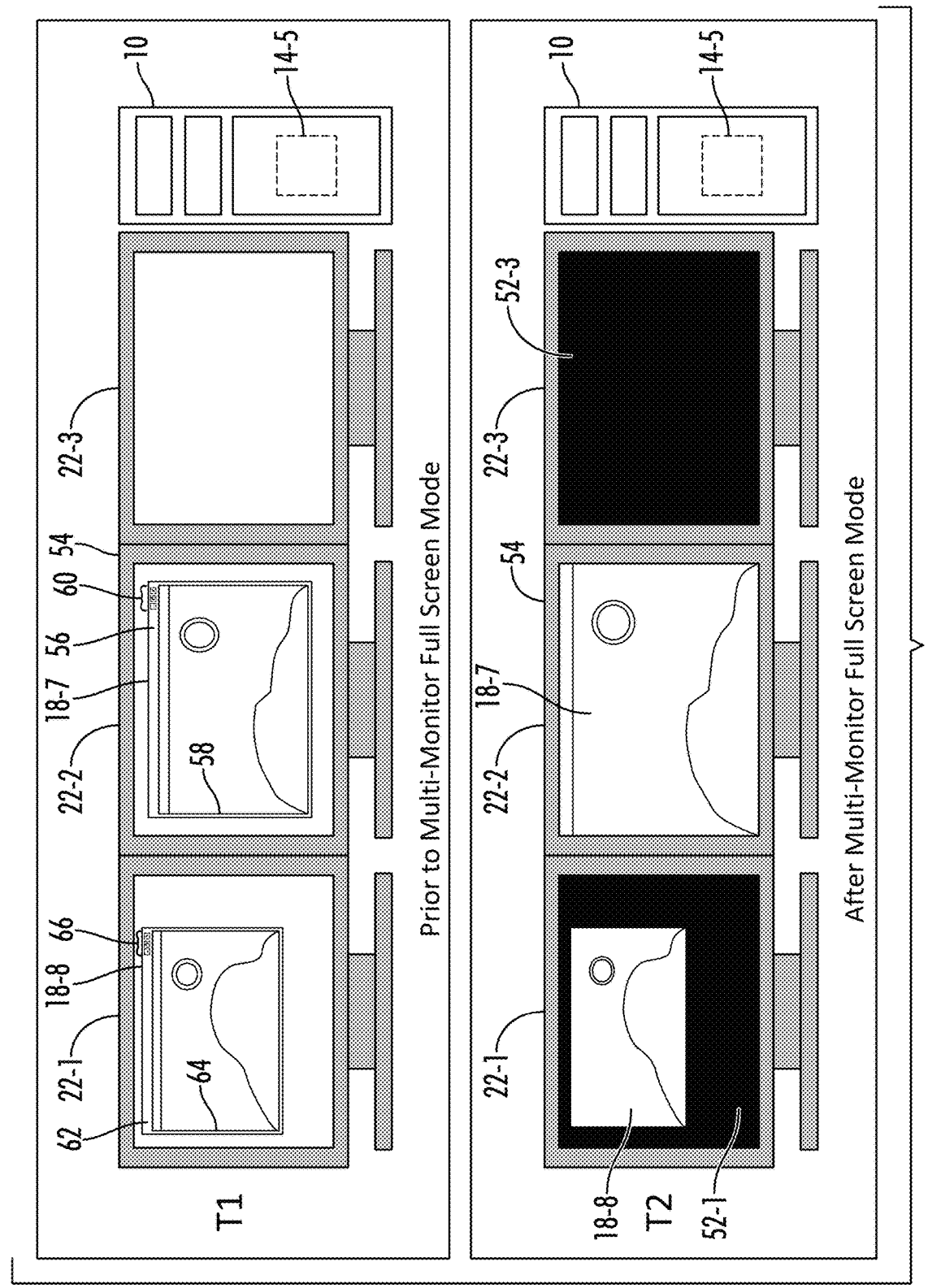

FIG. 8 visually depicts a before-and-after illustration of the multi-monitor full screen mode according to another embodiment. FIG. 8 will be discussed in conjunction with FIG. 3A. In this embodiment, similar to the embodiment discussed above with regard to FIG. 6, the window 18-7 is the main application window, and the application module 14-5 thus designates the monitor 22-2 as the primary monitor 54. Other processing is performed substantially similarly to that described with respect to FIG. 6, however, in this embodiment the application module 14-5 also includes an associated window 18-8, which is a child window. As illustrated at time T1, the window 18-8 includes a title bar 62, border 64, as well as various window sizing buttons 66. The application module 14-5 alters the attributes of the window 18-8 to have no title bar 62, border 64, or sizing buttons 60, and directs the WMM 16 to display the window 18-8 on top of the cover window 52-1. After implementation of the multi-monitor full screen mode according to this embodiment, the monitors 22-1-22-3 may appear as illustrated at time T2. Note that both the window 18-7 (the main application window) and the window 18-8 (the child application window) are borderless, have no title bar, and have no window sizing buttons.

Figure 9:
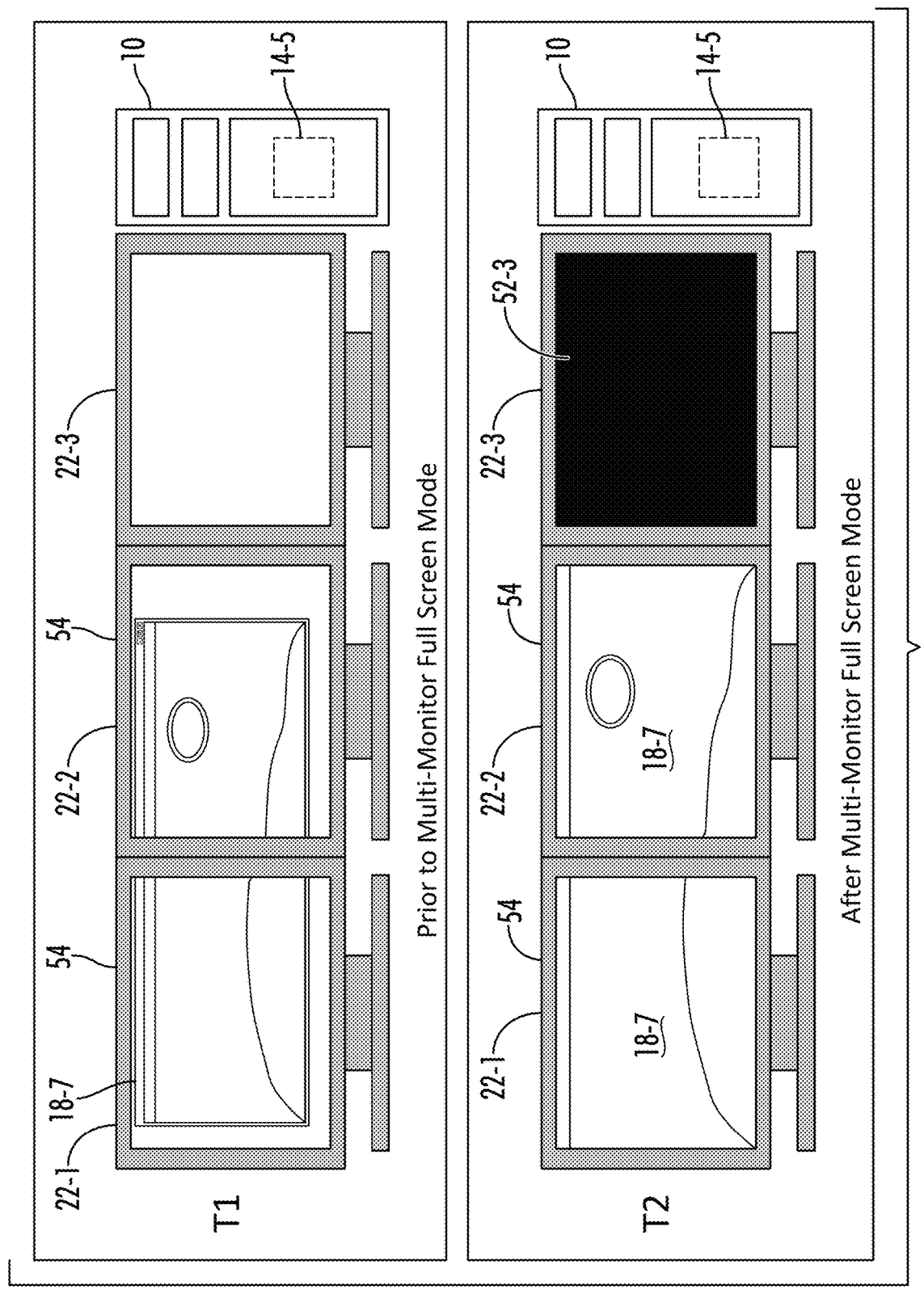

FIG. 9 visually depicts a before-and-after illustration of the multi-monitor full screen mode according to another embodiment. FIG. 9 will be discussed in conjunction with FIG. 3A. In this embodiment, at a time T1, the window 18-7 stretches across the monitor 22-1 and 22-2. Upon determining that the multi-monitor full screen mode has been requested, the application module 14-5 determines that the window 18-7 is displayed on both the monitors 22-1 and 22-2, and based on this determination designates both the monitors 22-1 and 22-2 as primary monitors 54.

The application module 14-5 then sizes the window 18-7 to have dimensions coextensive with the maximum display areas 24 of both the monitors 22-1 and 22-2. Other processing may be substantially similar to that described above with regard to FIG. 6. After implementation of the multi-monitor full screen mode according to this embodiment, the monitors 22-1-22-3 may appear as illustrated at time T2.

Figure 10:
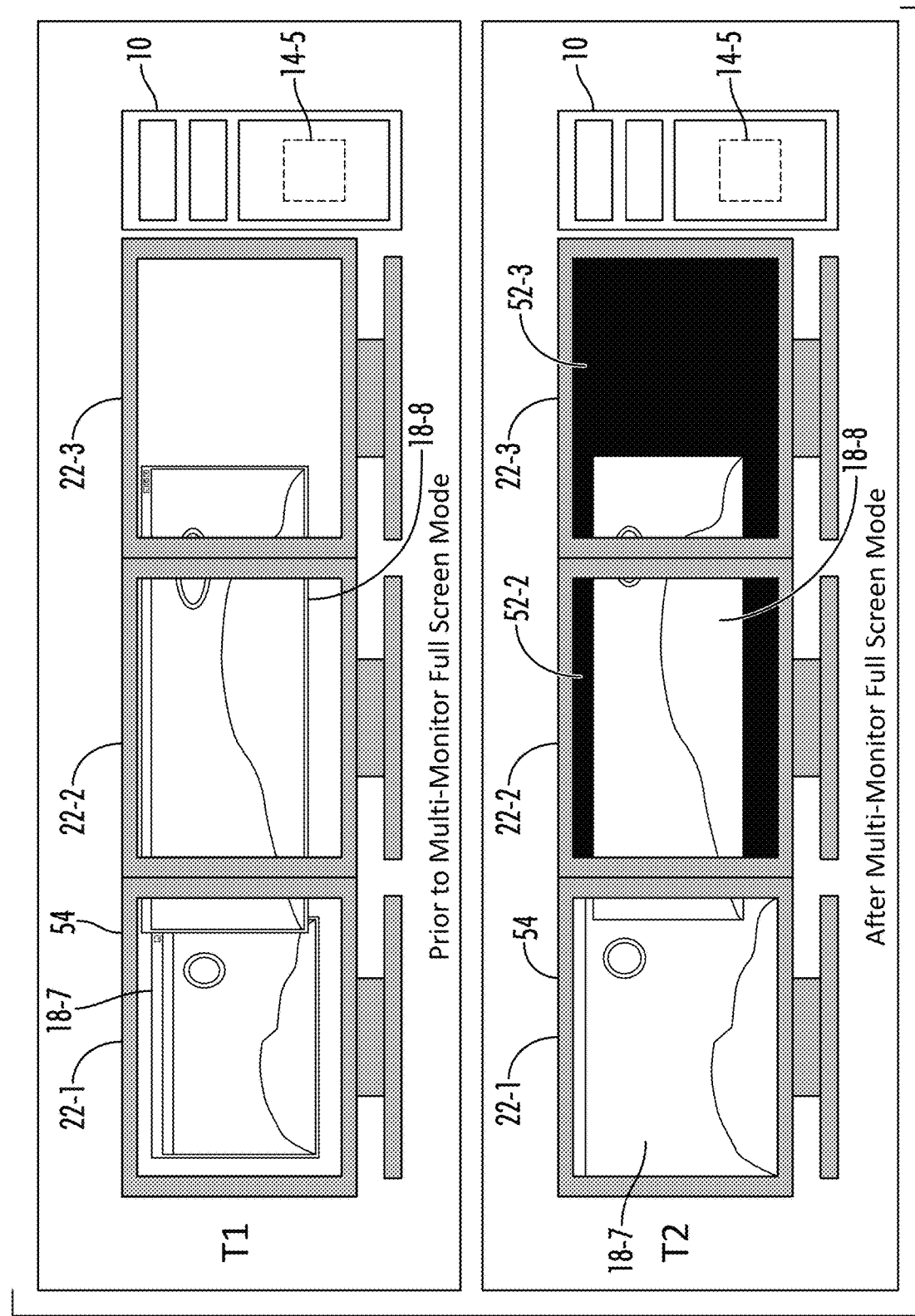

FIG. 10 visually depicts a before-and-after illustration of the multi-monitor full screen mode according to another embodiment. FIG. 10 will be discussed in conjunction with FIG. 3A. In this embodiment, at a time T1, a window 18-7 is displayed on the monitor 22-1. Assume for purposes of illustration that the window 18-7 is a primary application window of the application module 14-5. A window 18-8 expands across the three monitors 22-1-22-3. Assume for purposes of illustration that the window 18-8 is a child application window of the application module 14-5. The application module 14-5 determines that the window 18-7 is displayed on the monitors 22-1 in its entirety, and based on this determination designates the monitor 22-1 as the primary monitor 54.

The application module 14-5 then sizes the window 18-7 to have dimensions coextensive with the maximum display area 24 of the monitor 22-1, and 22-2, and alters attributes of the window 18-7 to be borderless, have no title bar, menu bar, or window sizing buttons. Similarly, the application module 14-5 alters the attributes of the window 18-8 to have no title bar, border, or window sizing buttons, and directs the WMM 16 to display the window 18-8 on top of the cover windows 52-1-52-3. Other processing may be substantially similar to that described above with regard to FIG. 6. After implementation of the multi-monitor full screen mode according to this embodiment, the monitors 22-1-22-3 may appear as illustrated at time T2.

Figure 11:
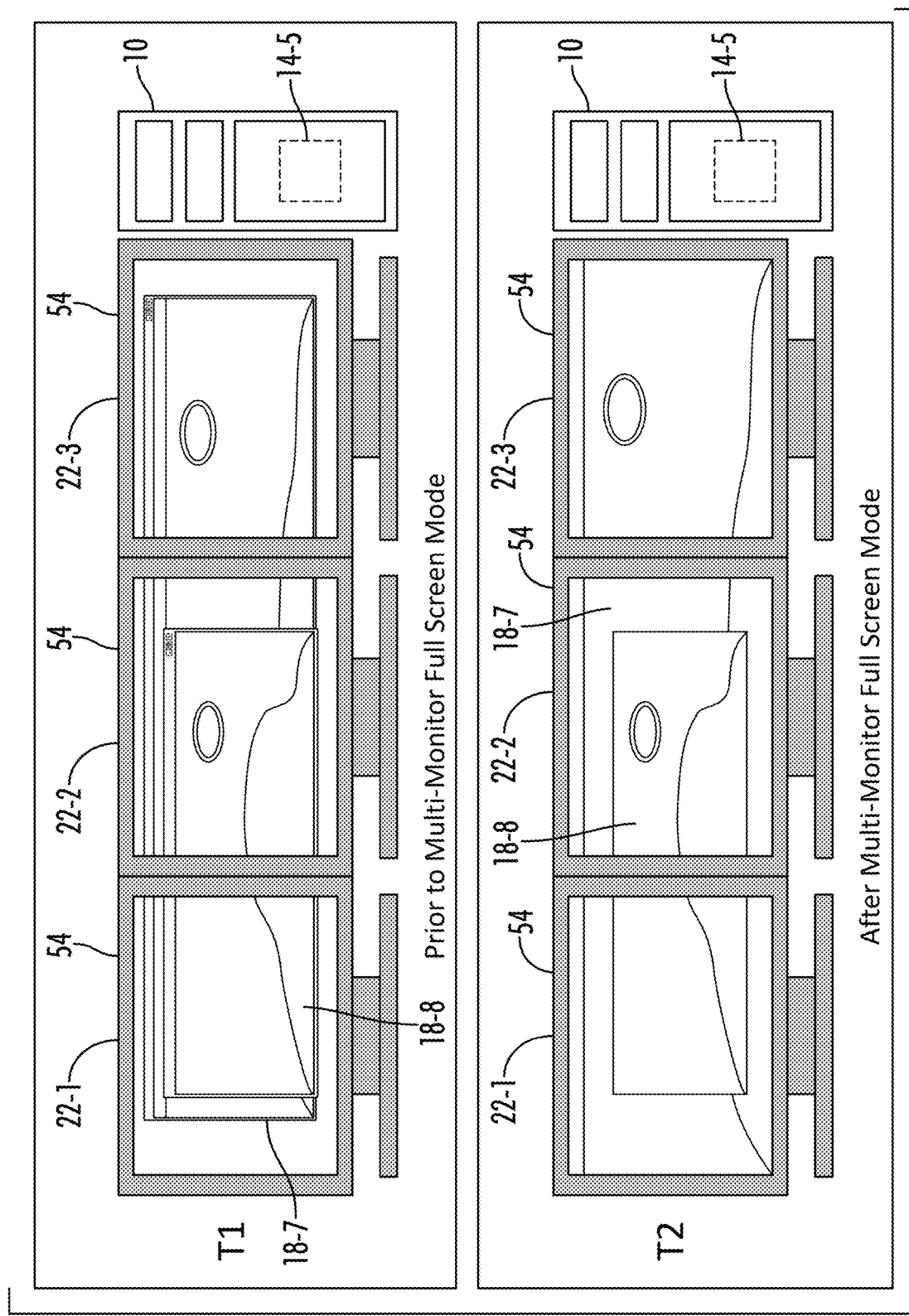

FIG. 11 visually depicts a before-and-after illustration of the multi-monitor full screen mode according to another embodiment. FIG. 11 will be discussed in conjunction with FIG. 3A. In this embodiment, at a time T1, the window 18-7 stretches across the monitors 22-1-22-3. Upon determining that the multi-monitor full screen mode has been requested, the application module 14-5 determines that the window 18-7 is displayed on each of the monitors 22-1-22-3, and based on this determination designates both the monitors 22-1-22-3 as primary monitors 54.

The application module 14-5 then sizes the window 18-7 to have dimensions coextensive with the maximum display areas 24 of all of the monitors 22-1-22-3. Other processing may be substantially similar to that described above with regard to FIG. 6. After implementation of the multi-monitor full screen mode according to this embodiment, the monitors 22-1-22-3 may appear as illustrated at time T2.

Figure 12:
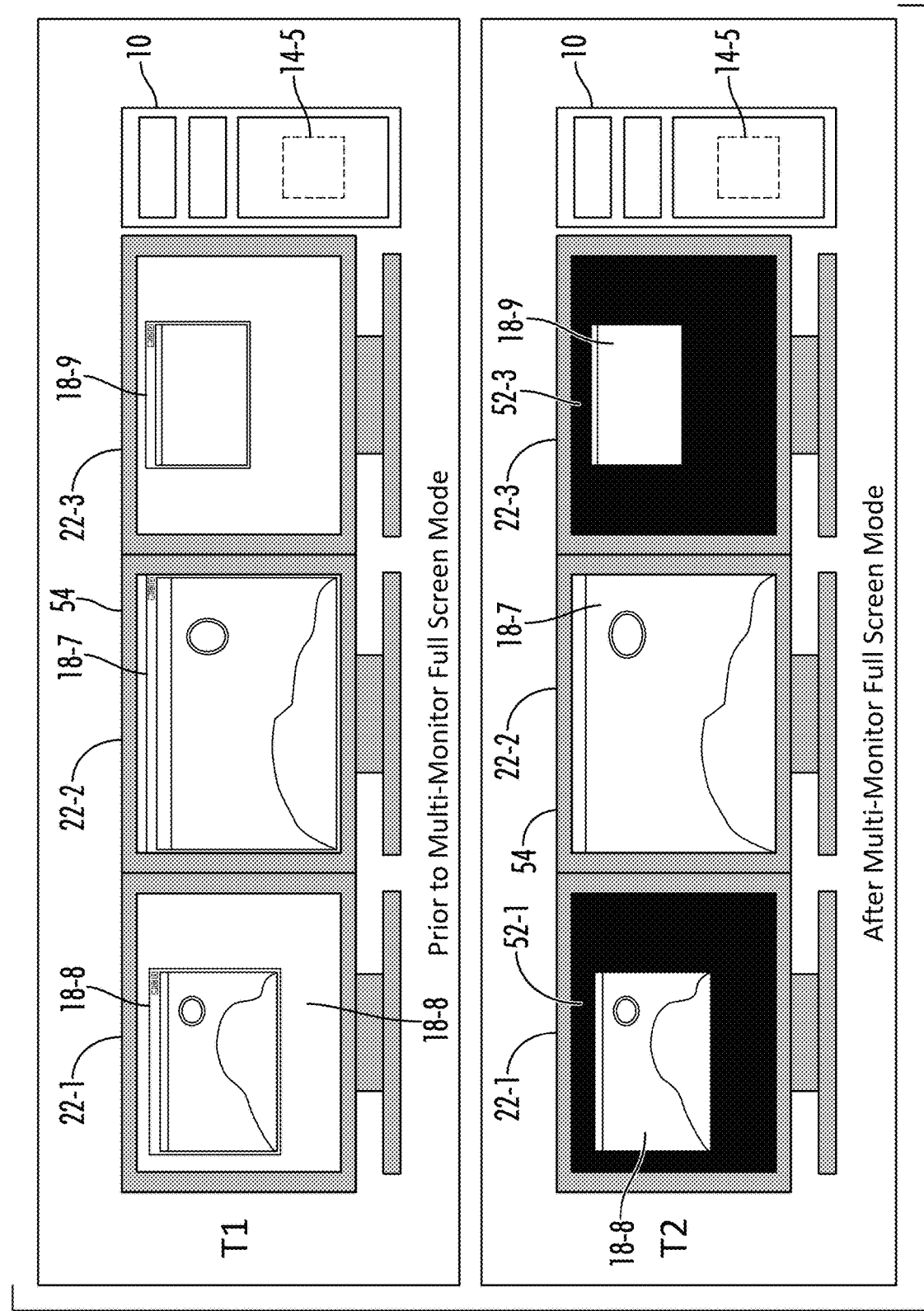

FIG. 12 visually depicts a before-and-after illustration of the multi-monitor full screen mode according to another embodiment. FIG. 12 will be discussed in conjunction with FIG. 3A. In this embodiment, at a time T1, a window 18-7 is displayed on the monitor 22-2. Assume for purposes of illustration that the window 18-7 is a primary application window of the application module 14-5. A window 18-8 is displayed on the monitor 22-1. Assume for purposes of illustration that the window 18-8 is a child application window of the application module 14-5. In this embodiment, the application module 14-5 interacts with one or more plug-in modules. The plug-in modules, for example, may be identified by the application module 14-5 at run-time via, for example, a configuration file, or by the existence of the plug-in modules in a certain folder or directory. The application module 14-5 may initiate such a plug-in module, and the plug-in module, may at some point in time generate a window 18-9. The plug-in module may provide to the application module 14-5 the window identifier (ID) of the window 18-9 so that the application module 14-5 is aware of the window 18-9.

In this embodiment, at a time T1, the window 18-7 is positioned entirely within the monitor 22-2. Upon determining that the multi-monitor full screen mode has been requested, the application module 14-5 determines that the window 18-7 is displayed on the monitor 22-2, and based on this determination designates the monitor 22-2 as the primary monitor 54. The application module 14-5 determines the full screen display area of the monitor 22-2. For purposes of illustration, assume that the full screen display area of the monitor 22-2 is coextensive in size with the maximum display area 24-2. The application module 14-5 sizes the window 18-7 to have dimensions that are coextensive with the full screen display area of the monitor 22-2. The application module 14-5 also alters the styles and other attributes associated with the window 18-7 such that the window 18-7 is borderless, has no title bar, and no window sizing buttons. The application module 14-5 then directs the WMM 16 to display the window 18-7 on the monitor 22-2.

As illustrated at time T1, the windows 18-8-18-9 also include title bars, borders, as well as various window sizing buttons. The application module 14-5 alters the attributes of the windows 18-8-18-9 to have no title bars, borders, or sizing buttons, and directs the WMM 16 to display the window 18-8 on top of the cover window 52-1, and the window 18-9 on top of the cover window 52-3, using the window ID provided by the plug-in module.

Other processing may be substantially similar to that described above with regard to FIG. 6. After implementation of the multi-monitor full screen mode according to this embodiment, the monitors 22-1-22-3 may appear as illustrated at time T2.

Figure 13:
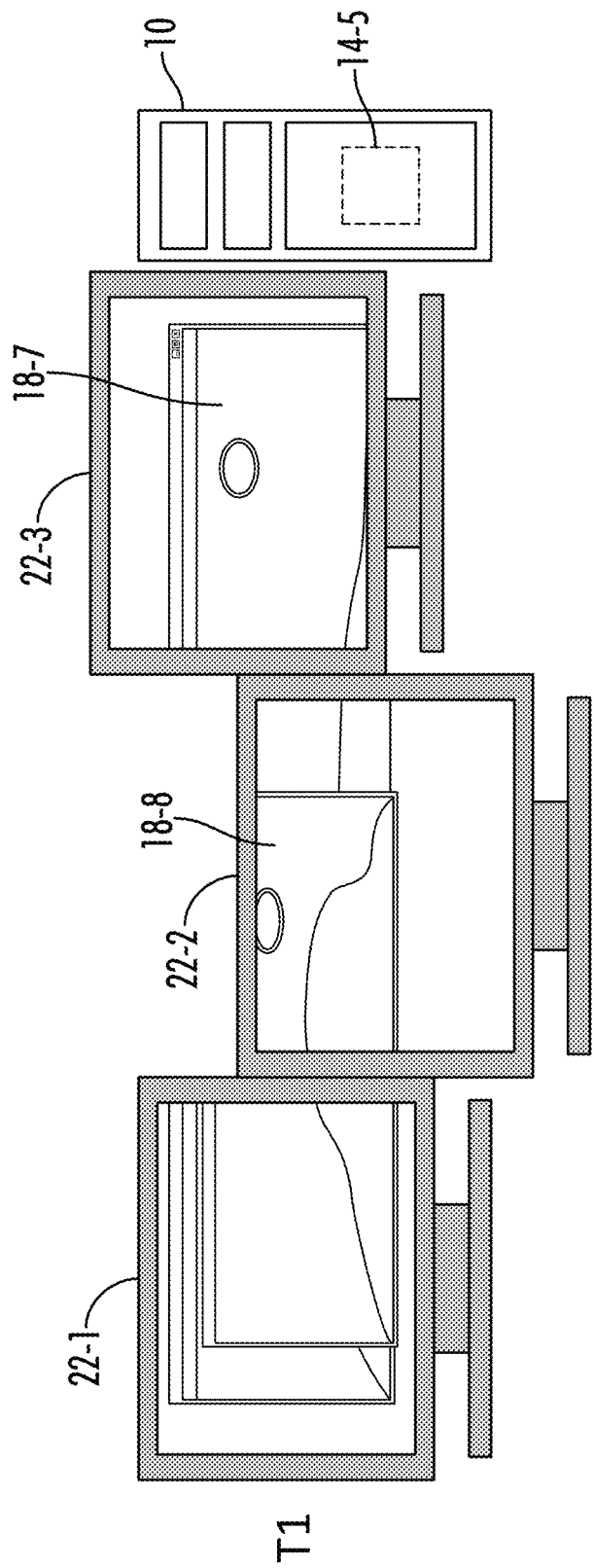
FIG. 13 illustrates a non-uniform three monitor configuration at a point in time prior to the initiation of a multi-monitor full screen mode.

FIGS. 13-17 illustrate embodiments wherein full screen display areas are configured across multiple monitors 22 that are arranged in a non-uniform manner. The full screen display areas may thus have dimensions larger or smaller than the maximum display area 24 of any single monitor 22. Referring first to FIG. 13, an example display at a time T1 prior to the application module 14-5 determining that the multi-monitor full screen mode has been requested is illustrated. Note that each of the monitors 22-1-22-3 is set at a different vertical height with respect to each other. For each of the embodiments illustrated in FIGS. 13-17, assume that the window 18-7 is a primary application window of the application module 14-5, and the window 18-8 is a child application window of the application module 14-5. Assume further that other than the sizing of the window 18-7 in accordance with the respective full screen display area, processing is substantially similar to that discussed with regard to FIG. 8, unless otherwise stated.

Figure 14A:
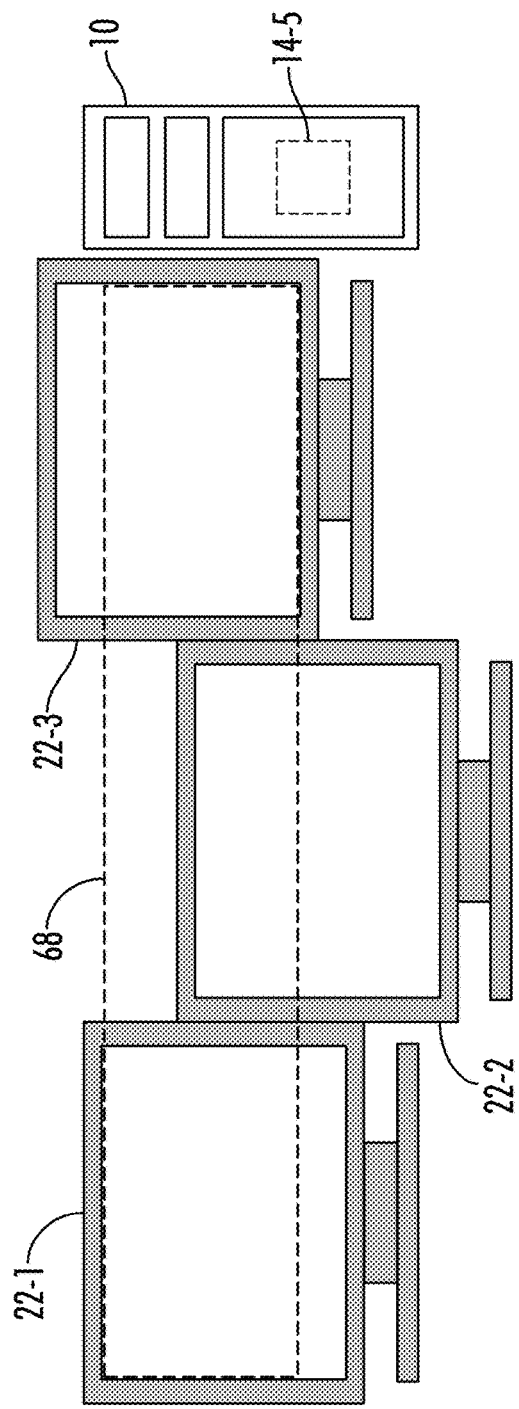
FIGS. 14A-14B illustrate the non-uniform three monitor configuration illustrated in FIG. 13, and a full screen display area that is not coextensive in size with a maximum display area of a monitor, at a point in time after initiation of the multi-monitor full screen mode, according to one embodiment.

FIG. 14A illustrates a full screen display area 68 in dashed outline according to one embodiment. The full screen display area 68 spans the three monitors 22-1-22-3 to have a size that vertically extends from the height of the top of the screen of the monitor 22-1 to the bottom of the screen of the monitor 22-3, and horizontally across the complete span of the monitors 22-1-22-3. The full screen display area 68 may be configured, for example, by the user 20, and stored on the device 10. Upon determining that the multi-monitor full screen mode has been requested, the application module 14-5 determines that the main application window 18-7 spans all three monitors 22-1-22-3. The application module 14-5 determines that a full screen display area 68 has been preconfigured. The application module 14-5 then sizes the window 18-7 based on the full screen display area 68, and directs the WMM 16 to draw the main application window 18-7. In other embodiments, the application module 14-5 may use the full screen display area 68 even in the absence of determining that the window 18-7 spans multiple monitors 22, such that the full screen display area 68 is used when multi-monitor full screen mode is requested, irrespective of the current location or size of the window 18-7.

Figure 14B:
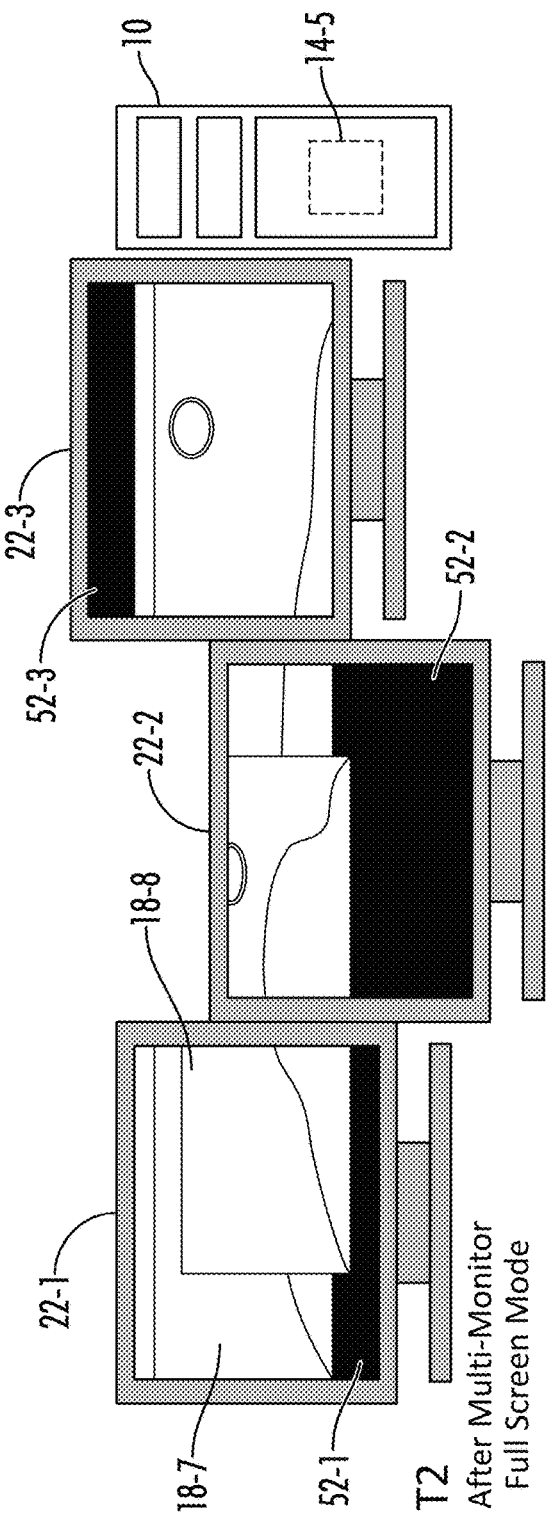

FIG. 14B illustrates an example display of the window 18-7 on the monitors 22 using the full screen display area 68 illustrated in FIG. 14A after entering multi-monitor full screen mode, according to one embodiment. Because the full screen display area 68 is not coextensive with the maximum display areas 24 of the monitors 22-1-22-3, portions of the cover windows 52-1-52-3 are seen by the user 20.

FIG. 15A illustrates a full screen display area 70 in dashed outline according to another embodiment. The full screen display area 70 spans the three monitors 22-1-22-3 to have a size that vertically extends from the height of the top of the screen of the monitor 22-3 to the bottom of the screen of the monitor 22-2, and horizontally across the complete span of the monitors 22-1-22-3. The full screen display area 70 may be configured, for example, by the user 20, and stored on the device 10. Upon determining that the multi-monitor full screen mode has been requested, the application module 14-5 determines that the window 18-7 spans all three monitors 22-1-22-3. The application module 14-5 determines that the full screen display area 70 has been preconfigured. The application module 14-5 then sizes the window 18-7 based on the full screen display area 70, and directs the WMM 16 to draw the window 18-7. In other embodiments, the application module may use the full screen display area 70 even in the absence of determining that the window 18-7 spans multiple monitors 22, such that the full screen display area 70 is used when multi-monitor full screen mode is requested, irrespective of the current location or size of the window 18-7.

FIG. 15B illustrates an example display of the window 18-7 on the monitors 22 using the full screen display area 70 illustrated in FIG. 15A after entering multi-monitor full screen mode, according to one embodiment. Because the full screen display area 70 is at least coextensive with the maximum display areas 24 of the monitors 22-1-22-3, the cover windows 52-1-52-3 are not seen by the user 20.

Figure 16A:
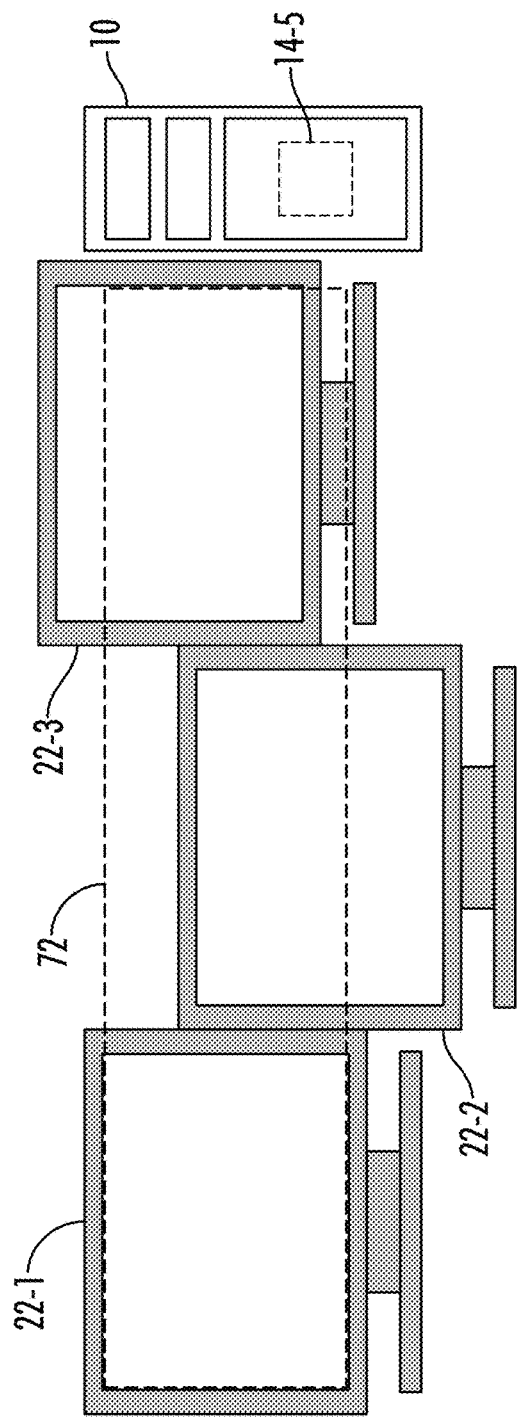
FIGS. 16A-16B illustrate the non-uniform three monitor configuration illustrated in FIG. 13, and a full screen display area that is not coextensive in size with a maximum display area of a monitor, at a point in time after initiation of the multi-monitor full screen mode, according to another embodiment.

FIG. 16A illustrates a full screen display area 72 in dashed outline according to another embodiment. The full screen display area 72 spans the three monitors 22-1-22-3 to have a size that vertically extends from the height of the top of the screen of the monitor 22-1 to the bottom of the screen of the monitor 22-1, and horizontally across the complete span of the monitors 22-1-22-3. The full screen display area 72 may be configured, for example, by the user 20, and stored on the device 10. Upon determining that the multi-monitor full screen mode has been requested, the application module 14-5 determines that the window 18-7 spans all three monitors 22-1-22-3. The application module 14-5 determines that the full screen display area 72 has been preconfigured. The application module 14-5 then sizes the window 18-7 based on the full screen display area 72, and directs the WMM 16 to draw the window 18-7. In other embodiments, the application module may use the full screen display area 72 even in the absence of determining that the window 18-7 spans multiple monitors 22, such that the full screen display area 72 is used when multi-monitor full screen mode is requested, irrespective of the current location or size of the window 18-7.

Figure 16B:
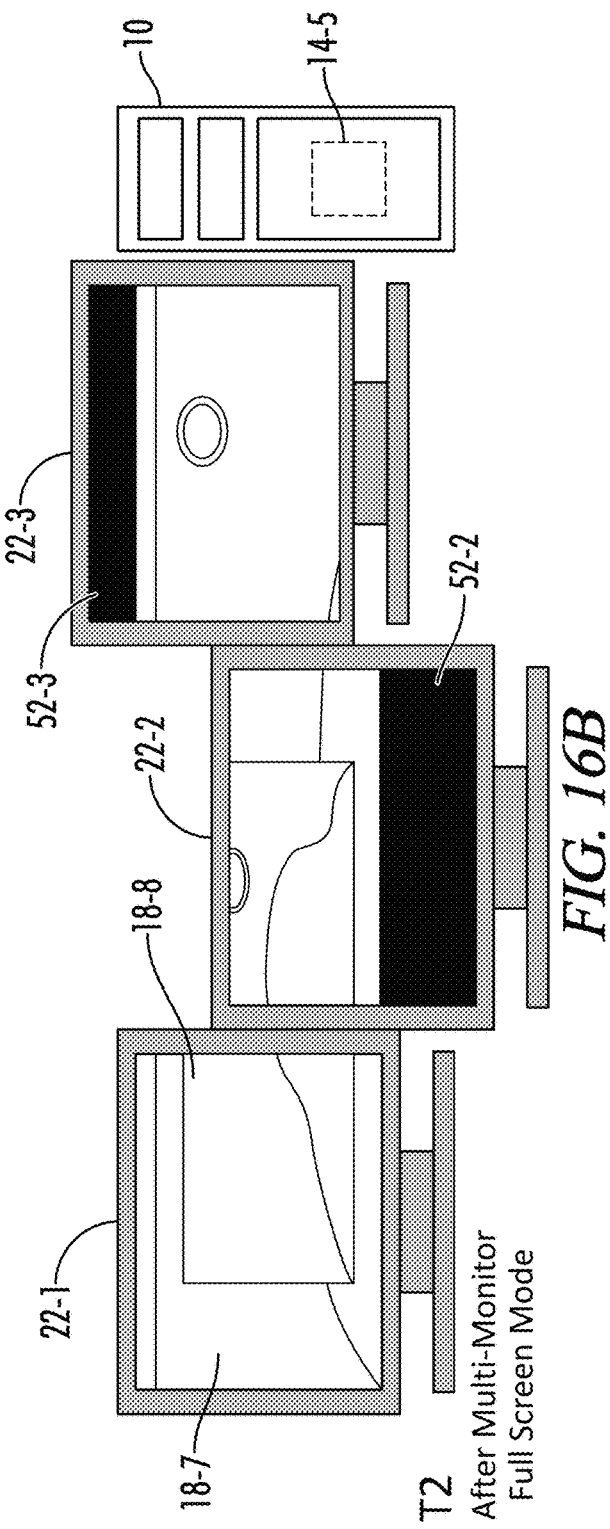

FIG. 16B illustrates an example display of the window 18-7 on the monitors 22 using the full screen display area 72 illustrated in FIG. 16A after entering multi-monitor full screen mode, according to one embodiment. Because the full screen display area 72 is at least coextensive with the maximum display areas of the monitor 22-1, the cover window 52-1 is not seen by the user 20. Because the full screen display area 72 is not coextensive with the maximum display areas of the monitors 22-2-22-3, portions of the cover windows 52-2-52-3 are seen by the user 20.

Figure 17A:
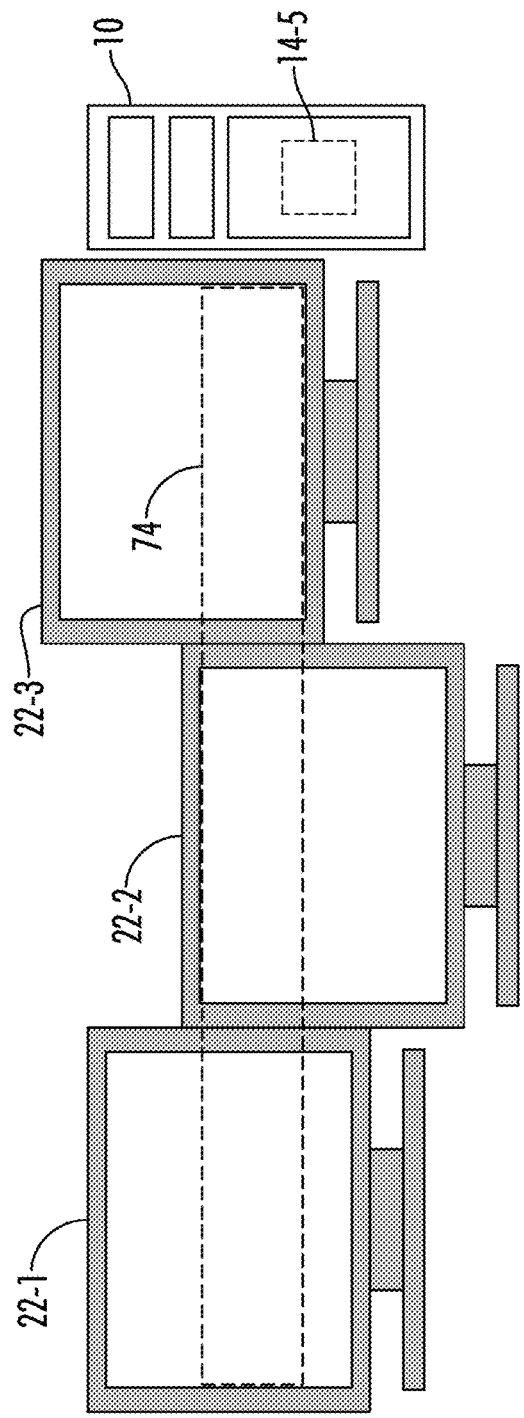
FIGS. 17A-17B illustrate the non-uniform three monitor configuration illustrated in FIG. 13, and a full screen display area that is not coextensive in size with a maximum display area of a monitor, at a point in time after initiation of the multi-monitor full screen mode, according to another embodiment.

FIG. 17A illustrates a full screen display area 74 in dashed outline according to another embodiment. The full screen display area 74 spans the three monitors 22-1-22-3 to have a size that vertically extends from the height of the top of the screen of the monitor 22-2 to the bottom of the screen of the monitor 22-3, and horizontally across the complete span of the monitors 22-1-22-3. The full screen display area 74 may be configured, for example, by the user 20, and stored on the device 10. Upon determining that the multi-monitor full screen mode has been requested, the application module 14-5 determines that the window 18-7 spans all three monitors 22-1-22-3. The application module 14-5 determines that the full screen display area 74 has been preconfigured. The application module 14-5 then sizes the window 18-7 based on the full screen display area 74, and directs the WMM 16 to draw the window 18-7. In other embodiments, the application module may use the full screen display area 74 even in the absence of determining that the window 18-7 spans multiple monitors 22, such that the full screen display area 74 is used when multi-monitor full screen mode is requested, irrespective of the current location or size of the window 18-7.

Figure 17B:
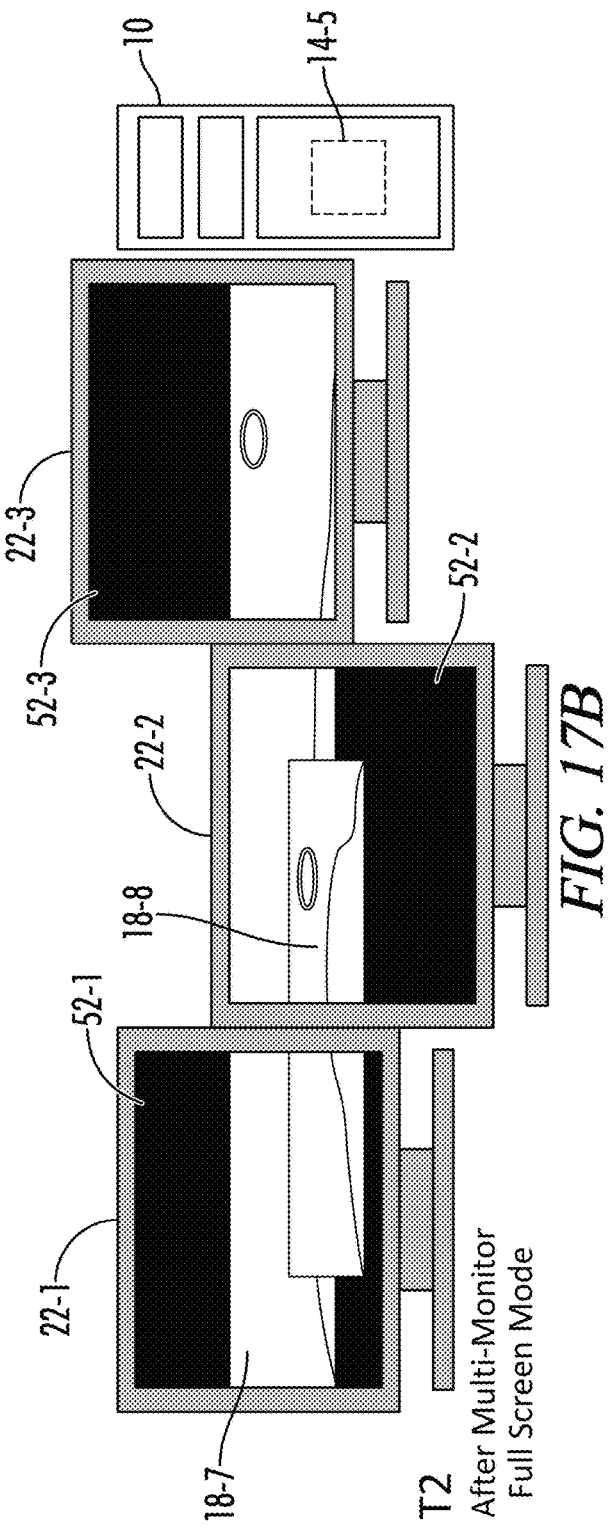

FIG. 17B illustrates an example display of the window 18-7 on the monitors 22 using the full screen display area 74 illustrated in FIG. 17A after entering multi-monitor full screen mode, according to one embodiment. Because the full screen display area 74 is not coextensive with the maximum display areas 24 of the monitors 22-1-22-3, portions of the cover windows 52-1-52-3 may be seen by the user 20. In this embodiment, the window 18-8 may also be automatically scaled to fit completely within the monitors 22-1-22-3.

Figure 18:
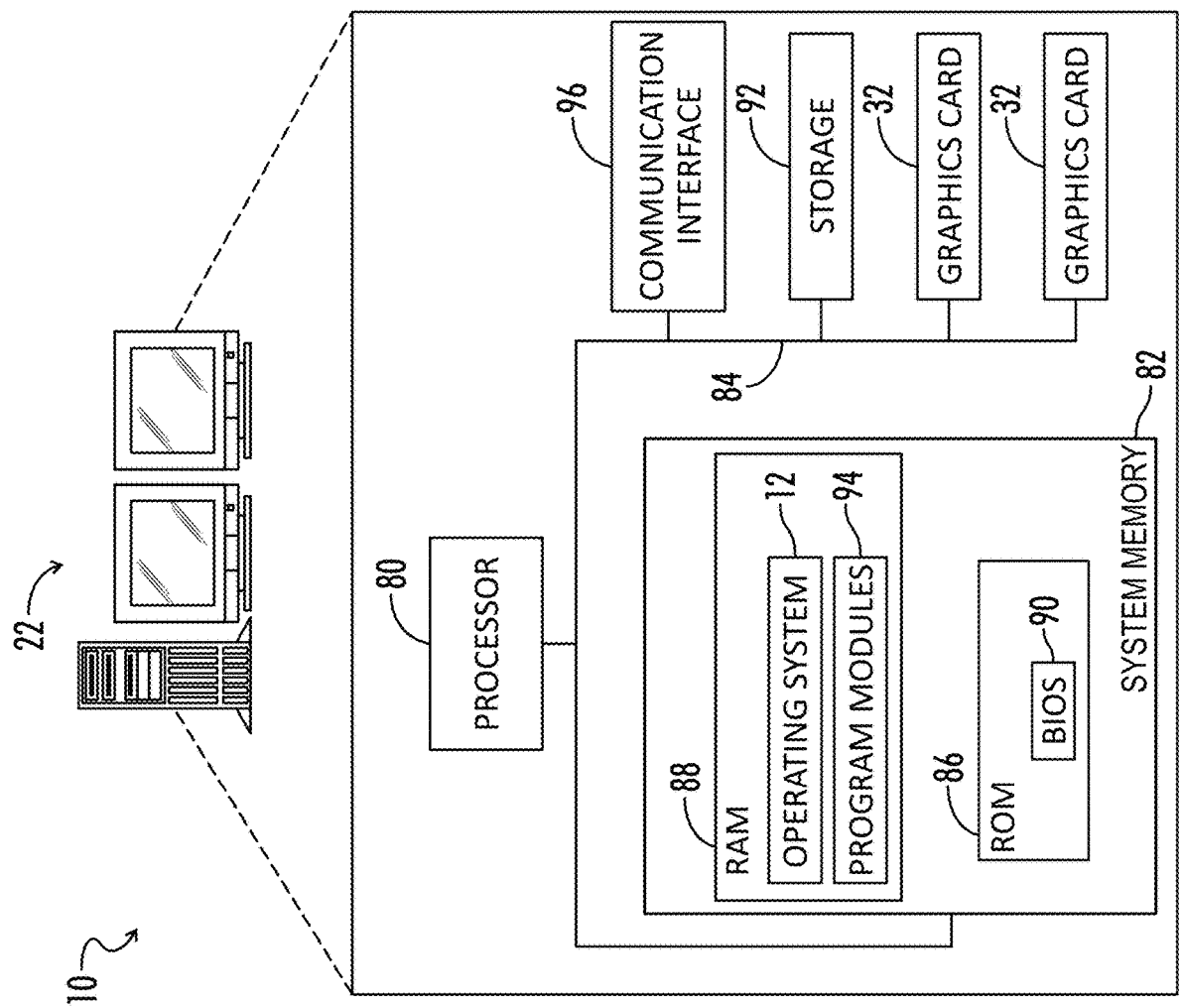
FIG. 18 is a block diagram of a device according to one embodiment.

FIG. 18 is a block diagram of the device 10 according to one embodiment. The device 10 may comprise any computing or processing device capable of executing software instructions to implement the functionality described herein, such as a work station, a desktop or laptop computer, a tablet computer, a special purpose simulator, a game console, or the like. The device 10 includes the processor 80, a system memory 82, and a system bus 84. The system bus 84 provides an interface for system components including, but not limited to, the system memory 82 and the processor 80.

The processor 80 can be any commercially available or proprietary processor. Dual microprocessors and other multi-processor architectures may also be employed as the processor 80.

The system memory 82 may include non-volatile memory 86 (e.g., read only memory (ROM), erasable programmable read only memory (EPROM), electrically erasable programmable read only memory (EEPROM), etc.) and/or volatile memory 88 (e.g., random access memory (RAM)). A basic input/output system (BIOS) 90 may be stored in the non-volatile memory 86, and can include the basic routines that help to transfer information between elements within the device 10. The volatile memory 88 may also include a high-speed RAM, such as static RAM for caching data.

The device 10 may further include a computer-readable storage 92, which may comprise, for example, an internal hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 92 and other drives, associated with computer-readable and computer-usable media, provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory cards, cartridges, and the like, may also be used in the operating environment, and further, that any such media may contain computer-executable instructions for performing functionality described herein.

A number of modules can be stored in the computer-readable storage 92 and in the volatile memory 88, including the operating system 12 and one or more program modules 94, which may implement the functionality described herein in whole or in part, including, for example, functionality associated with the application module 14-5 and the WMM 16, and other processing and functionality described herein. It is to be appreciated that the embodiments can be implemented with various commercially available operating systems 12 or combinations of operating systems 12.

In one embodiment, the application module 14-5 is stored in the system memory 82 and is operative to provide instructions to the processor 80. The processor 80 is responsive to the instructions of the application module 14-5. The application module 14-5 is operative to perform the functionality described herein with respect to the application module 14-5.

All or a portion of the embodiments may be implemented as a computer program product stored on a transitory or non-transitory computer-usable or computer-readable storage medium, such as the computer-readable storage 92, which includes complex programming instructions, such as complex computer-readable program code, configured to cause the processor 80 to carry out the steps described herein. Thus, the computer-readable program code can comprise software instructions for implementing the functionality of the embodiments described herein when executed on the processor 80. The processor 80, in conjunction with the program modules 94, may serve as a control system for the device 10 that is configured to, or adapted to, implement the functionality described herein.

The user 20 may be able to enter commands and information into the device 10 through one or more input devices, such as, for example, a keyboard (not illustrated), a pointing device such as a mouse (not illustrated), or a touch-sensitive surface (not illustrated). Other input devices (not illustrated)

may include a microphone, an infrared remote control, a gesture recognition system, a joystick, a game pad, a stylus pen, or the like.

The device 10 may also include a communication interface 96 suitable for communicating with a network. The device 10 includes one or more graphics cards 32, each of which may have one or more video ports 50 (not illustrated) for coupling to corresponding monitors 22.

Those skilled in the art will recognize improvements and modifications to the preferred embodiments of the present disclosure. All such improvements and modifications are considered within the scope of the concepts disclosed herein and the claims that follow.

What is claimed is:

1. A computer-implemented method for implementing a multi-monitor full screen mode in an application module executing on a device comprising a processor, the method comprising computer-implemented operations for:
   determining, by the application module, that the multi-monitor full screen mode is requested;
   determining a number (N) of monitors that are coupled to a plurality of video ports of the device, wherein N is greater than one, the N monitors each having a respective maximum display area based on a corresponding monitor screen;
   directing, by the application module, a window management module (WMM) that is independent of the application module to display at least one cover window that has dimensions coextensive with all dimensions of the respective maximum display areas of the N monitors combined;
   determining at least one primary monitor of the N monitors;
   determining a full screen display area associated with the at least one primary monitor;
   sizing a main application window of the application module to have dimensions that are at least coextensive with dimensions of the full screen display area; and
   directing the WMM to display the main application window on the at least one primary monitor.

2. The method of claim 1, further comprising receiving a user-initiated request to enter the multi-monitor full screen mode.

3. The method of claim 1, wherein the WMM is configured to manage a plurality of windows associated with a plurality of different application modules.

4. The method of claim 1, wherein the full screen display area is coextensive with the maximum display area of the at least one primary monitor.

5. The method of claim 1, wherein the full screen display area is smaller than the maximum display area of the at least one primary monitor.

6. The method of claim 1, further comprising:
   determining a second primary monitor of the N monitors; and
   wherein the full screen display area is associated with the at least one primary monitor and the second primary monitor.

7. The method of claim 6, wherein determining the full screen display area associated with the at least one primary monitor comprises:
   accessing a configuration file; and
   obtaining the full screen display area from the configuration file.

8. The method of claim 1, further comprising:
   setting attributes of the main application window such that the main application window is borderless, non-resizable, and lacks a minimize button and a maximize button.

9. The method of claim 1, further comprising:
   prior to sizing the main application window, determining a plurality of attribute values of attributes of the main application window, the attribute values identifying visual characteristics of the main application window includes a size of the main application window and a location of the main application window; and
   storing the plurality of attribute values in a memory.

10. The method of claim 9, further comprising:
    receiving a request to exit the multi-monitor full screen mode;
    accessing the memory to obtain the plurality of attribute values;
    altering the attributes of the main application window to have the plurality of attribute values; and
    directing the WMM to display the main application window.

11. The method of claim 1, further comprising:
    determining a child application window associated with the application module, the child application window being displayed on a particular monitor of the N monitors prior to determining that the multi-monitor full screen mode is requested;
    after determining that the multi-monitor full screen mode is requested:
      setting attributes of the child application window such that the child application window is borderless, cannot be minimized and cannot be maximized; and
      directing the WMM to display the child application window on top of any other window displayed on the particular monitor.

12. The method of claim 11, further comprising:
    determining that a user has selected, with an input device, a border region of the child application window;
    based on the determination, altering an icon of a pointer device to indicate a resize operation;
    determining that the user has dragged the icon to a new location on the particular monitor; and
    directing the WMM to display the child application window with a size based on the new location.

13. The method of claim 1, wherein directing the WMM that is independent of the application module to display the at least one cover window comprises:
    directing the WMM that is independent of the application module to display a plurality of cover windows, the each cover window being displayed on a different one of the N monitors, and being coextensive with the respective maximum display area of the different one of the N monitors.

14. The method of claim 1, wherein determining the at least one primary monitor comprises:
    determining a particular monitor of the N monitors on which the main application window is located, and designating the particular monitor as the at least one primary monitor.

15. The method of claim 1, wherein determining the at least one primary monitor comprises:
    determining that the main application window spans multiple monitors of the N monitors;
    determining that a majority of an area of the main application window is displayed on a particular monitor of the multiple monitors; and designating the particular monitor as the at least one primary monitor.

16. A device, comprising:
a plurality of video ports configured to communicate with a plurality of monitors;
a memory;
a processor coupled to the plurality of video ports and the memory;
an application module in the memory and operative to provide instructions to the processor, the processor responsive to the instructions of the application module, the application module operative to:
   determine that a multi-monitor full screen mode is requested;
   determining a number (N) of the plurality of monitors coupled to the plurality of video ports, wherein N is greater than one, the N monitors each having a respective maximum display area based on a corresponding monitor screen;
   direct a window management module (WMM) that is independent of the application module to display at least one cover window that has dimensions coextensive with all dimensions of the respective maximum display areas of the N monitors combined;
   determine at least one primary monitor of the N monitors;
   determine a full screen display area associated with the at least one primary monitor;
   size a main application window of the application module to have dimensions that are at least coextensive with dimensions of the full screen display area; and
   direct the WMM to display the main application window on the at least one primary monitor.

17. The device of claim 16, wherein the WMM is configured to manage a plurality of windows associated with a plurality of different application modules.

18. The device of claim 16, wherein the application module is further configured to:
   determine a second primary monitor of the N monitors; and
   wherein the full screen display area is associated with the at least one primary monitor and the second primary monitor.

19. A computer program product for implementing a multi-monitor full screen mode in an application module, the computer program product stored on a non-transitory computer-readable storage medium and including instructions configured to cause a processor to carry out the steps of:
   determining that the multi-monitor full screen mode is requested;
   determining a number (N) of monitors that are coupled to a plurality of video ports of a device, wherein N is greater than one, the N monitors each having a respective maximum display area based on a corresponding monitor screen;
   directing a window management module (WMM) that is independent of the application module to display at least one cover window that has dimensions coextensive with dimensions of the respective maximum display areas of the N monitors;
   determining at least one primary monitor of the N monitors;
   determining a full screen display area associated with the at least one primary monitor;
   sizing a main application window of the application module to have dimensions that are at least coextensive with dimensions of the full screen display area;
   directing the WMM to display the main application window on the at least one primary monitor;
   determining a child application window associated with the application module, the child application window being displayed on a particular monitor of the N monitors prior to determining that the multi-monitor full screen mode is requested; and
   after determining that the multi-monitor full screen mode is requested:
      setting attributes of the child application window such that the child application window is borderless, cannot be minimized and cannot be maximized; and
      directing the WMM to display the child application window on top of any other window displayed on the particular monitor.

20. The method of claim 1, wherein the at least one cover window is configured to conceal any pre-existing windows associated with other application modules that are displayed on the N monitors.

* * * * *